(12) United States Patent
Lin et al.

(10) Patent No.: US 9,946,047 B2
(45) Date of Patent: Apr. 17, 2018

(54) ANNUAL OPTICAL SPACER, IMAGE LENS SYSTEM, AND MOBILE TERMINAL

(71) Applicant: LARGAN PRECISION CO., LTD., Taichung (TW)

(72) Inventors: Cheng-Feng Lin, Taichung (TW); Ming-Ta Chou, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 567 days.

(21) Appl. No.: 14/256,992

(22) Filed: Apr. 20, 2014

(65) Prior Publication Data

US 2015/0253532 A1    Sep. 10, 2015

Related U.S. Application Data

(60) Provisional application No. 61/947,442, filed on Mar. 4, 2014.

(51) Int. Cl.
| | |
|---|---|
| *G02B 27/00* | (2006.01) |
| *G02B 7/02* | (2006.01) |
| *G02B 5/00* | (2006.01) |
| *G02B 13/00* | (2006.01) |

(52) U.S. Cl.
CPC ............ *G02B 7/021* (2013.01); *G02B 5/003* (2013.01); *G02B 5/005* (2013.01); *G02B 7/022* (2013.01); *G02B 27/0018* (2013.01); *G02B 13/001* (2013.01)

(58) Field of Classification Search
CPC ........ G02B 1/11; G02B 27/0018; G02B 5/02; G02B 5/28
USPC .......................................................... 359/601
See application file for complete search history.

(56) References Cited

U.S. PATENT DOCUMENTS

| | | | | |
|---|---|---|---|---|
| 6,898,030 B1* | 5/2005 | Lin | ......................... | G02B 7/021 359/740 |
| 7,443,608 B2* | 10/2008 | Dillon | .................... | G02C 7/021 359/601 |
| 9,042,019 B2* | 5/2015 | Su | .......................... | G02B 1/115 359/581 |
| 2003/0215575 A1* | 11/2003 | Martin | .................... | B32B 27/08 427/407.1 |

(Continued)

OTHER PUBLICATIONS

STIC search report for case 14256992.*

*Primary Examiner* — James Greece
*Assistant Examiner* — Sharrief Broome
(74) *Attorney, Agent, or Firm* — CKC & Partners Co., Ltd.

(57) ABSTRACT

An annular optical spacer includes a first side portion, a second side portion, an outer annular portion, an inner annular portion and an anti-reflective layer. The second side portion is opposite to the first side portion. The outer annular portion connects the first side portion with the second side portion. The inner annular portion connects the first side portion with the second side portion. A vertical distance between the inner annular portion and a central axis of the annular optical spacer is shorter than a vertical distance between the outer annular portion and the central axis of the annular optical spacer. The inner annular portion includes at least one rugged surface. The rugged surface includes a plurality of annular protruding structures, and the annular protruding structures are coaxially arranged around the central axis. The anti-reflective layer is on top of the rugged surface.

21 Claims, 20 Drawing Sheets

(56) References Cited

U.S. PATENT DOCUMENTS

| | | | |
|---|---|---|---|
| 2008/0030675 A1* | 2/2008 | Dillon | G02C 7/021 351/159.62 |
| 2012/0314288 A1* | 12/2012 | Lai | G02B 13/0035 359/503 |
| 2013/0010377 A1* | 1/2013 | Okuyama | G02B 27/0018 359/819 |
| 2013/0033753 A1* | 2/2013 | Su | G02B 1/115 359/581 |
| 2013/0222913 A1* | 8/2013 | Tomoda | G02B 1/113 359/513 |

\* cited by examiner

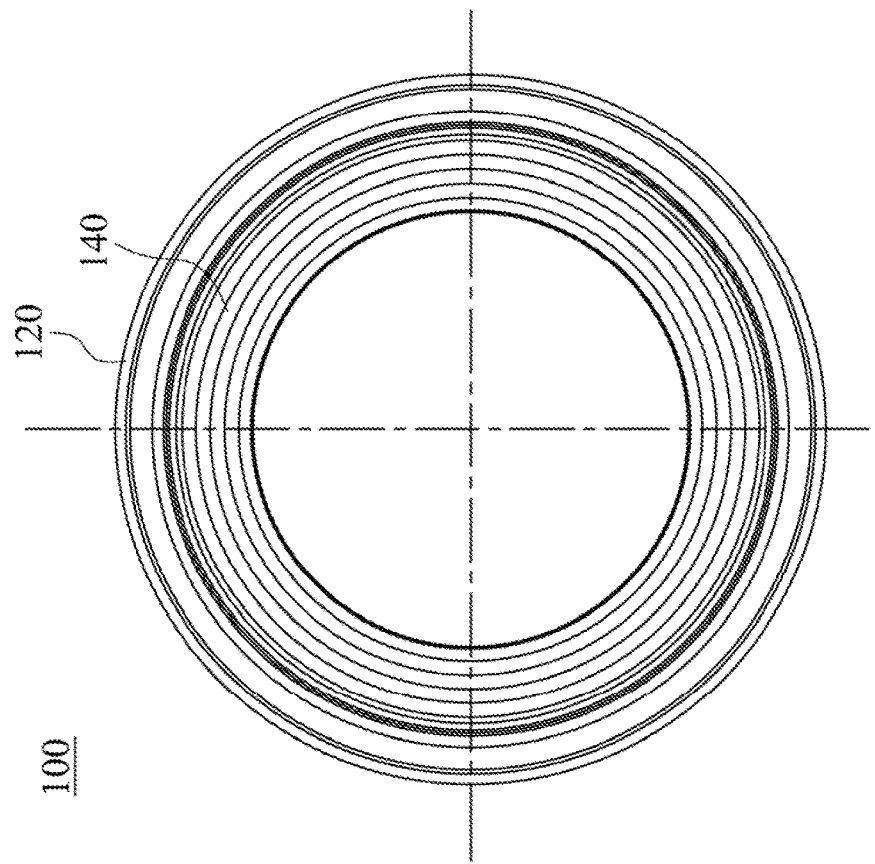
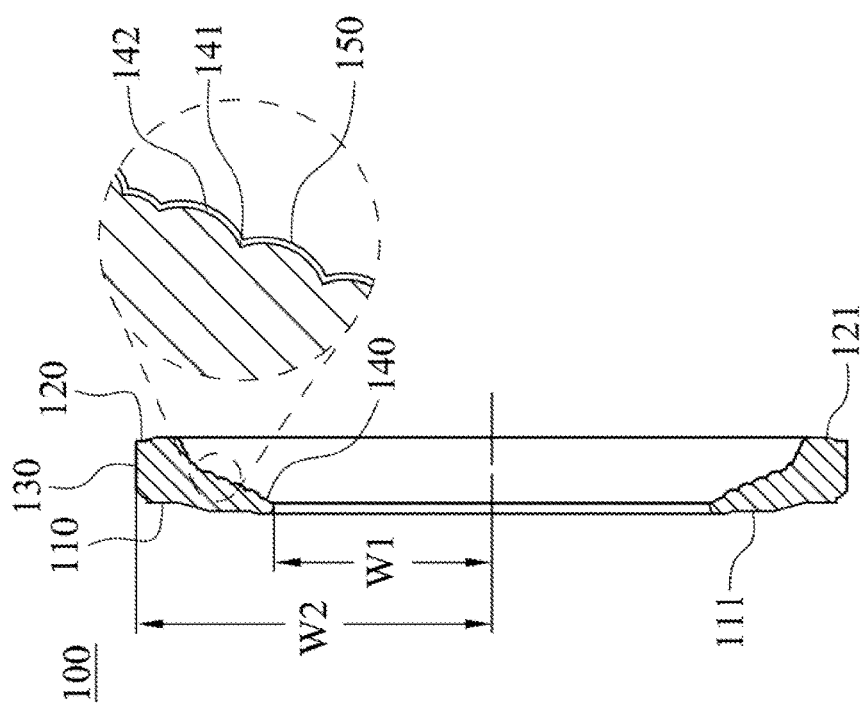
Fig. 1A
Fig. 1B

ANNUAL OPTICAL SPACER, IMAGE LENS SYSTEM, AND MOBILE TERMINAL

RELATED APPLICATIONS

The application claims priority to U.S. Provisional Patent Application No. 61/047,442 filed Mar. 4, 2014, which is herein incorporated by reference.

BACKGROUND

Technical Field

The present disclosure relates to an optical spacer. More particularly, the present disclosure relates to an annular optical spacer with annular protruding structures.

Description of Related Art

Due to the popularity of personal electronic products and mobile communication products having camera functionalities, such as smart phones and tablet personal computers, the demand for compact lens assemblies has been increasing, and the requirements for high resolution and image quality of present compact lens assemblies increase significantly.

An optical spacer is generally used to provide an optical space between any two lenses in a lens assembly. A surface property of the optical spacer relates to an effect of suppressing unexpected lights. Accordingly, an image quality of the lens assembly is influenced by the surface property of the optical spacer.

A conventional optical spacer is typically manufactured by an injection molding method. The optical spacer has a smooth and bright surface, which is featured with high reflectivity. As a result, the conventional optical spacer cannot suppress the unexpected lights.

Another conventional optical spacer is provided for suppressing the unexpected lights. The conventional optical spacer is atomized with a surface treatment, so that a reflectivity thereof is reduced. However, the effect of suppressing unexpected lights is still limited. Therefore, the conventional optical spacer cannot satisfy the requirements of high-end optical systems with camera functionalities.

Given the above, how to improve the surface property of the optical spacer for improving the image quality of compact lens assemblies has become one of the important subjects.

SUMMARY

According to one aspect of the present disclosure, an annular optical spacer includes a first side portion, a second side portion, an outer annular portion, an inner annular portion and an anti-reflective layer. The second side portion is opposite to the first side portion. The outer annular portion connects the first side portion with the second side portion. The inner annular portion connects the first side portion with the second side portion. A vertical distance between the inner annular portion and a central axis of the annular optical spacer is shorter than a vertical distance between the outer annular portion and the central axis of the annular optical spacer. The inner annular portion includes at least one rugged surface. The rugged surface includes a plurality of annular protruding structures, and the annular protruding structures are coaxially arranged around the central axis. The anti-reflective layer is on top of the rugged surface.

According to another aspect of the present disclosure, an image lens system includes a barrel, a lens assembly and an annular optical spacer. The lens assembly is disposed in the barrel. The annular optical spacer is disposed in the barrel and is connected with the lens assembly. The annular optical spacer includes a first side portion, a second side portion, an outer annular portion, an inner annular portion and an anti-reflective layer. The second side portion is opposite to the first side portion. The outer annular portion connects the first side portion with the second side portion. The inner annular portion connects the first side portion with the second side portion. A vertical distance between the inner annular portion and a central axis of the annular optical spacer is shorter than a vertical distance between the outer annular portion and the central axis of the annular optical spacer. The inner annular portion includes at least one rugged surface. The rugged surface includes a plurality of annular protruding structures, and the annular protruding structures are coaxially arranged around the central axis and integrated with the rugged surface. The anti-reflective layer is on top of the rugged surface.

According to yet another aspect of the present disclosure, a mobile terminal includes the aforementioned image lens system.

BRIEF DESCRIPTION OF THE DRAWINGS

The disclosure can be more fully understood by reading the following detailed description of the embodiment, with reference made to the accompanying drawings as follows:

FIG. 1A is a schematic view of an annular optical spacer according to one embodiment of the present disclosure;

FIG. 1B is a cross-sectional schematic view of the annular optical spacer in FIG. 1A;

DETAILED DESCRIPTION

Annular Optical Spacer

Figure 1C:
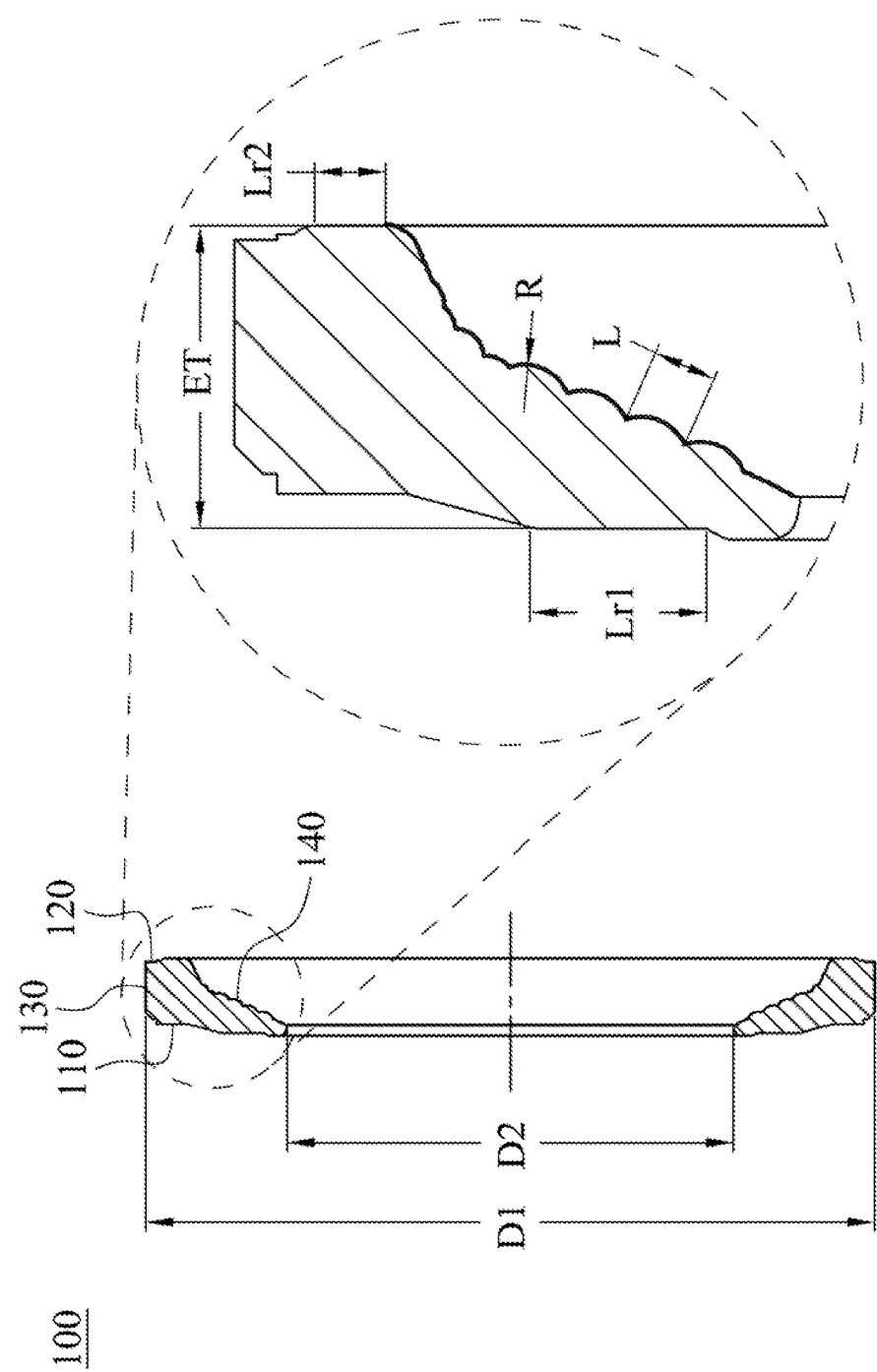
FIG. 1C is a cross-sectional schematic view showing parameters of the annular optical spacer in FIG. 1A.

FIG. 1A is a schematic view of an annular optical spacer 100 according to one embodiment of the present disclosure. FIG. 1B is a cross-sectional schematic view of the annular optical spacer 100 in FIG. 1A. In FIG. 1B, the annular optical spacer 100 includes a first side portion 110, a second side portion 120, an outer annular portion 130, an inner annular portion 140 and an anti-reflective layer 150. The second side portion 120 is opposite to the first side portion 110. The outer annular portion 130 connects the first side portion 110 with the second side portion 120. The inner annular portion 140 connects the first side portion 110 with the second side portion 120. A vertical distance W1 between the inner annular portion 140 and a central axis of the annular optical spacer 100 is shorter than a vertical distance W2 between the outer annular portion 130 and the central axis of the annular optical spacer 100. The inner annular portion 140 includes at least one rugged surface 141. The rugged surface 141 includes a plurality of annular protruding structures 142, and the annular protruding structures 142 are coaxially arranged around the central axis. The anti-reflective layer 150 is on top of the rugged surface 141. Therefore, the unexpected lights can be eliminated effectively. When the annular optical spacer 100 is applied to an image lens system, the image quality of the image lens system can be accordingly enhanced.

The annular protruding structures 142 are integrated with the rugged surface 141. Therefore, the manufacturing yields of the annular optical spacer 100 can be enhanced.

The first side portion 110 can include an abutting surface 111, and the second side portion 120 can include an abutting surface 121. The abutting surface 111 of the first side portion 110 and the abutting surface 121 of the second side portion 120 are perpendicular to the central axis of the annular optical spacer 100. Therefore, the annular optical spacer 100 can abut or engage with other lens elements or optical elements, and the structural strength of the finished assembly having the annular optical spacer 100 and the lens elements or the optical elements can be enhanced.

The anti-reflective layer 150 can include a plurality of films (shown in FIG. 1D and FIG. 1E), and the films are stacked orderly. When a number of the films is N, the following relationship can be satisfied: 2<N<12. Therefore, the manufacturability and the anti-reflective effect of the anti-reflective layer 150 can be balanced.

When a reflectivity of the anti-reflective layer 150 for light wavelengths between 400 nm and 700 nm is Ref, the following relationship can be satisfied: Ref<2%. Therefore, the unexpected lights which are visible for human eyes can be eliminated effectively.

The annular optical spacer 100 can be made of opaque plastic material, and annular optical spacer 100 can be manufactured by an injection molding method. Therefore, the manufacturing efficiency of the annular optical spacer 100 can be enhanced, and the unexpected lights can be further eliminated.

When the annular optical spacer 100 is manufactured by the injection molding method, the first side portion 110 can include the abutting surface 111, and the second side portion 120 can include the abutting surface 121. The abutting surface 111 of the first side portion 110 and the abutting surface 121 of the second side portion 120 are perpendicular to the central axis of the annular optical spacer 100. A radial length of the abutting surface 111 of the first side portion 110 is longer than a radial length of the abutting surface 121 of the second side portion 120. In a molding stage of the injection molding method, the first side portion 110 is adjacent to a moving part of a mold, and the second side portion 120 is adjacent to a fixed part of the mold. Therefore, the manufacturing yields of the annular optical spacer 100 can be enhanced.

When each of the annular protruding structures 142 is arc-shaped, and a number of the annular protruding structures 142 is M, the following relationship can be satisfied: 4≤M. Therefore, the unexpected lights can be suppressed effectively. Preferably, the following relationship can be satisfied: 7≤M≤20.

The rugged surface 141 can be an atomized surface. Therefore, the manufacturing yields of the annular optical spacer 100 can be enhanced.

FIG. 1C is a cross-sectional schematic view showing parameters of the annular optical spacer 100 in FIG. 1A. A maximum outer diameter of the annular optical spacer 100 is D1. A minimum inner diameter of the annular optical spacer 100 is D2. A radial length of the abutting surface 111 of the first side portion 110 is Lr1. A radial length of the abutting surface 121 of the second side portion 120 is Lr2. A distance between the abutting surface 111 of the first side portion 110 and the abutting surface 121 of the second side portion 120 in parallel with the central axis is ET. When each of the annular protruding structures 142 is arc-shaped, a maximum width of each of the annular protruding structures 142 is L, and a curvature radius of each of the annular protruding structures 142 is R.

When each of the annular protruding structures 142 is arc-shaped, a maximum width of each of the annular protruding structures 142 is L, and a curvature radius of each of the annular protruding structures 142 is R, the following relationship can be satisfied: 0.65<L/R<1.65. Therefore, the ratio of L and R is proper. On one hand, the reflective paths of the unexpected lights can be changed by the annular protruding structures 142 so as to effectively suppress the unexpected lights. On the other hand, the molding of the annular optical spacer 100 will not become too difficult.

When each of the annular protruding structures 142 is arc-shaped, and a curvature radius of each of the annular protruding structures 142 is R, the following relationship can be satisfied: 0.02 mm<R<0.10 mm. Therefore, the manufacturability of the annular optical spacer 100 can be maintained. Preferably, the following relationship can be satisfied: 0.035 mm<R<0.07 mm.

When a maximum outer diameter of the annular optical spacer 100 is D1, and a minimum inner diameter of the annular optical spacer 100 is D2, the following relationship can be satisfied: 0.4≤D1/D2≤0.8. Therefore, the structural strength of the annular optical spacer 100 can be maintained, and the annular optical spacer 100 is suitable for being applied to a compact image lens system.

When a distance between the abutting surface 111 of the first side portion 110 and the abutting surface 121 of the second side portion 120 in parallel with the central axis is ET, the following relationship can be satisfied: 0.15 mm<ET<0.75 mm. Therefore, the structural strength of the annular optical spacer 100 can be maintained, and the annular optical spacer 100 is suitable for being applied to a compact image lens system.

Figure 1D:
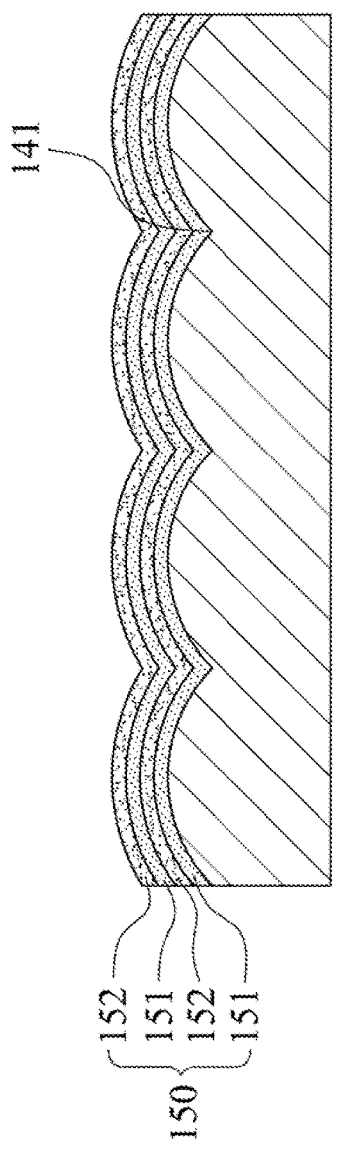
FIG. 1D is a cross-sectional schematic view showing films of an anti-reflective layer of the annular optical spacer in FIG. 1A.

FIG. 1D is a cross-sectional schematic view showing films of the anti-reflective layer 150 of the annular optical spacer 100 in FIG. 1A. The anti-reflective layer 150 according to present disclosure can include a plurality of high refractive index films 151 and a plurality of low refractive index films 152. The high refractive index films 151 and the low refractive index films 152 are alternately stacked. Therefore, a reflectivity of the anti-reflective layer 150 can be reduced. In the embodiment, a number of the high refractive index films 151 is two, and a number of the low refractive index films 152 is two. When a refractive index of each of the high refractive index films 151 is NA, and a refractive index of each of the low refractive index films 152 is NB, the following relationships can be satisfied: 1.8≤NA; and NB≤1.5. Therefore, a reflectivity of the anti-reflective layer 150 can be further reduced. More specifically, the high refractive index films 151 can be made of material with high refractive index, such as $TiO_2$, $Ta_2O_5$ or $Nb_2O_5$. The low refractive index films 152 can be made of material with low refractive index, such as $SiO_2$ or $MgF_2$.

Figure 1E:
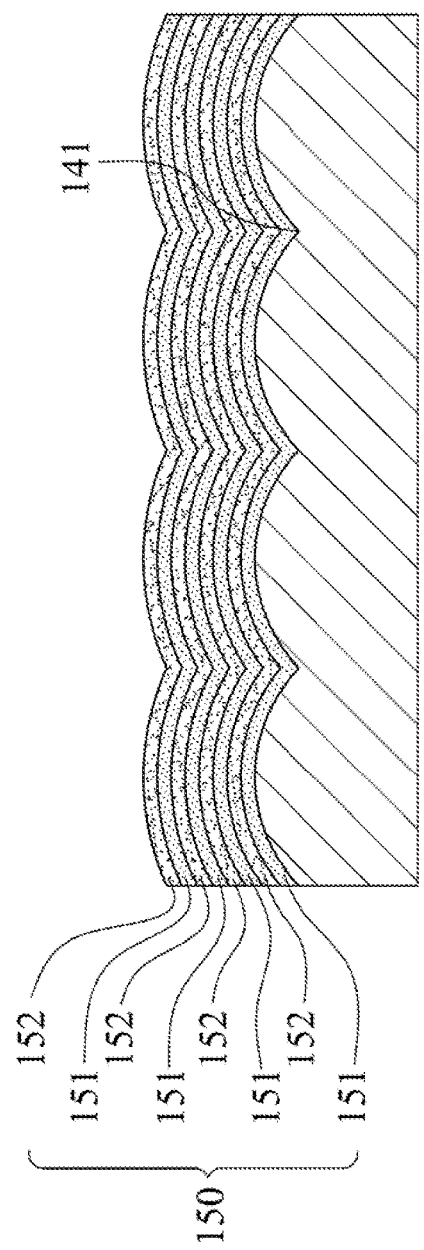
FIG. 1E is a cross-sectional schematic view showing films of an anti-reflective layer of an annular optical spacer according to another embodiment of the present disclosure.

FIG. 1E is a cross-sectional schematic view showing films of an anti-reflective layer 150 of an annular optical spacer 100 according to another embodiment of the present disclosure. In the embodiment, a number of the high refractive index films 151 is four, and a number of the low refractive index films 152 is four. Therefore, the reflectivity of the anti-reflective layer 150 can be further reduced.

According to the above description of the present disclosure, the following 1st-11th specific examples are provided for further explanation.

1St Example

Figure 2:
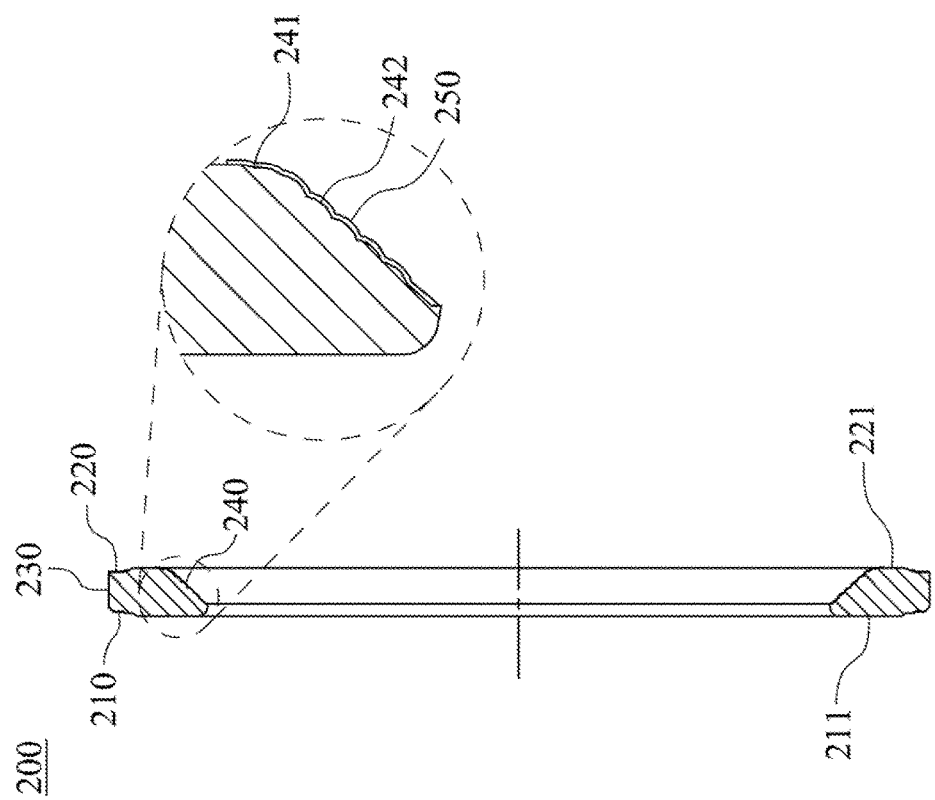
FIG. 2 is a cross-sectional schematic view of an annular optical spacer according to the 1st example of the present disclosure.

FIG. 2 is a cross-sectional schematic view of an annular optical spacer 200 according to the 1st example of the present disclosure. In FIG. 2, the annular optical spacer 200 includes a first side portion 210, a second side portion 220, an outer annular portion 230, an inner annular portion 240 and an anti-reflective layer 250. The second side portion 220 is opposite to the first side portion 210. The outer annular portion 230 connects the first side portion 210 with the second side portion 220. The inner annular portion 240 connects the first side portion 210 with the second side portion 220, and a vertical distance between the inner annular portion 240 and a central axis of the annular optical spacer 200 is shorter than a vertical distance between the outer annular portion 230 and the central axis of the annular optical spacer 200.

The first side portion 210 includes an abutting surface 211, and the abutting surface 211 is perpendicular to the central axis of the annular optical spacer 200.

The second side portion 220 includes an abutting surface 221, and the abutting surface 221 is perpendicular to the central axis of the annular optical spacer 200.

The inner annular portion 240 includes a rugged surface 241. The rugged surface 241 includes six annular protruding structures 242. The annular protruding structures 242 are coaxially arranged around the central axis. The annular protruding structures 242 are integrated with the rugged surface 241. The annular protruding structures 242 are arc-shaped.

The anti-reflective layer 250 is on top of the rugged surface 241. The an reflective layer 250 includes 4 high refractive index films (not shown) and 4 low refractive index films (not shown), and the high refractive index films and the low refractive index films are alternately stacked. The high refractive index films are made of $TiO_2$, and the low refractive index films are made of $SiO_2$.

Furthermore, the rugged surface 241 is an atomized surface. The annular optical spacer 200 is made of opaque plastic material, and the annular optical spacer 200 is manufactured by an injection molding method. In a molding step of the injection molding method, the first side portion 210 is adjacent to a moving part of a mold, and the second side portion 220 is adjacent to a fixed part of the mold.

A maximum outer diameter of the annular optical spacer 200 is D1. A minimum inner diameter of the annular optical spacer 200 is D2. A radial length of the abutting surface 211 of the first side portion 210 is Lr1. A radial length of the abutting surface 221 of the second side portion 220 is Lr2. A distance between the abutting surface 211 of the first side portion 210 and the abutting surface 221 of the second side portion 220 in parallel with the central axis is ET. A maximum width of each of the annular protruding structures 242 is L. A curvature radius of each of the annular protruding structures 242 is R. A reflectivity of the anti-reflective layer 250 for light wavelengths between 400 nm and 700 nm is Ref. A refractive index of the high refractive index film is NA. A refractive index of the low refractive index film is NB.

The values of D1, D2, Lr1, Lr2, ET, L, R, L/R, D1/D2, Ref, NA and NB of the 1st example are shown in Table 1.

TABLE 1

| 1st example | | | |
|---|---|---|---|
| D1 (mm) | 5.35 | R (mm) | 0.05 |
| D2 (mm) | 4.05 | L/R | 0.80, 1.00 |
| Lr1 (mm) | 0.39 | D1/D2 | 1.32 |
| Lr2 (mm) | 0.15 | Ref (%) | <2 |
| ET (mm) | 0.31 | NA | 2.34 |
| L (mm) | 0.04, 0.05 | NB | 1.46 |

Figure 13:
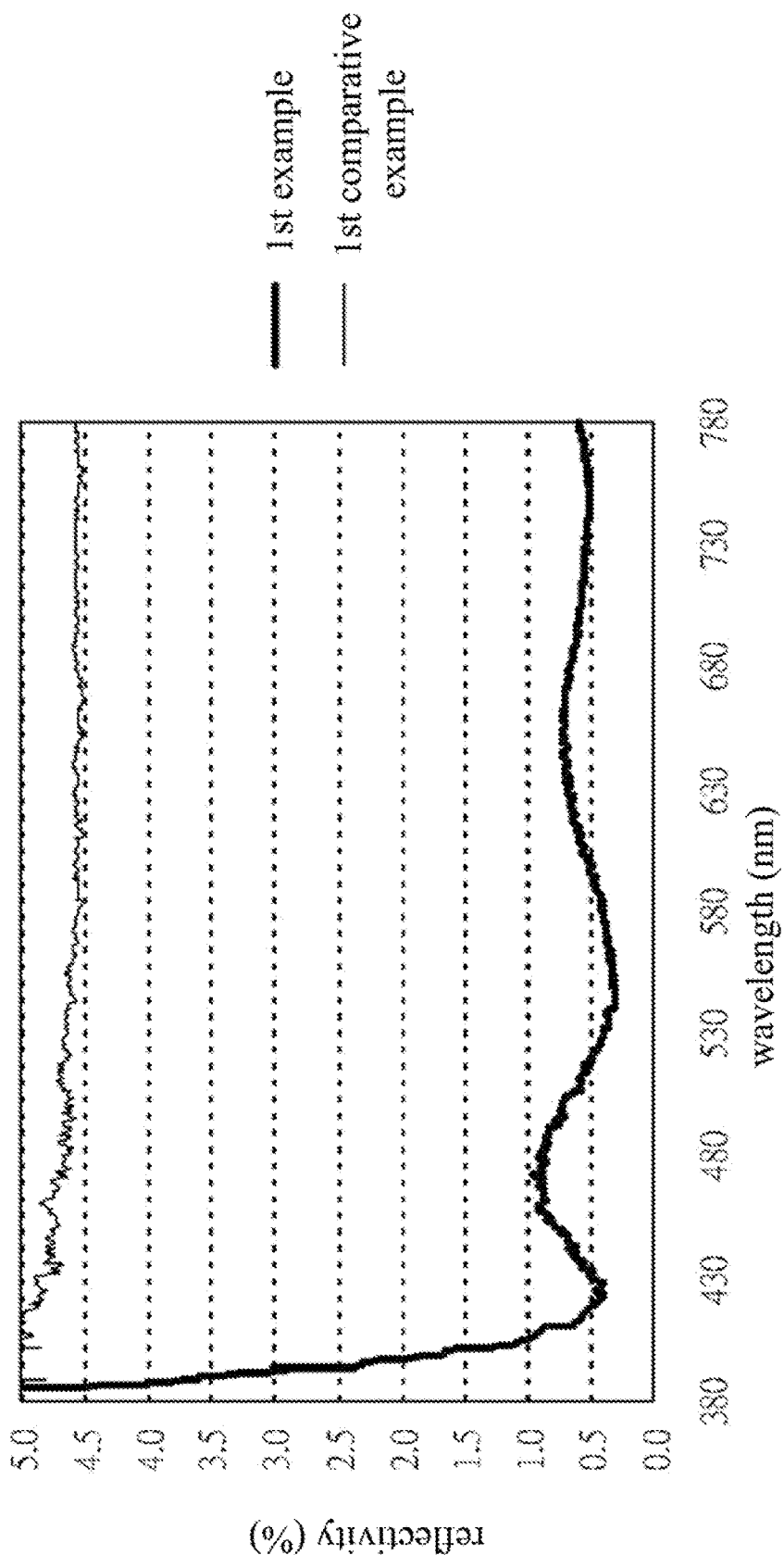
FIG. 13 shows relationships between reflectivity and wavelength of the annular optical spacer in FIG. 2 and an annular optical spacer of a 1st comparative example.

FIG. 13 shows relationships between reflectivity and wavelength of the annular optical spacer 200 in FIG. 2 and an annular optical spacer according to the 1st comparative example. The annular optical spacer according to the 1st comparative example does not have the anti-reflective layer 250, and the other structures of the annular optical spacer according to the 1st comparative example are the same as the annular optical spacer 200 according to the 1st example. As shown in FIG. 13, when the wavelength range is between 400 nm and 700 nm, a reflectivity of the annular optical spacer 200 according to the 1st example is lower than a reflectivity of the annular optical spacer according to the 1st comparative example. Therefore, the unexpected lights which are visible for human eyes can be eliminated effectively.

2Nd Example

Figure 3:
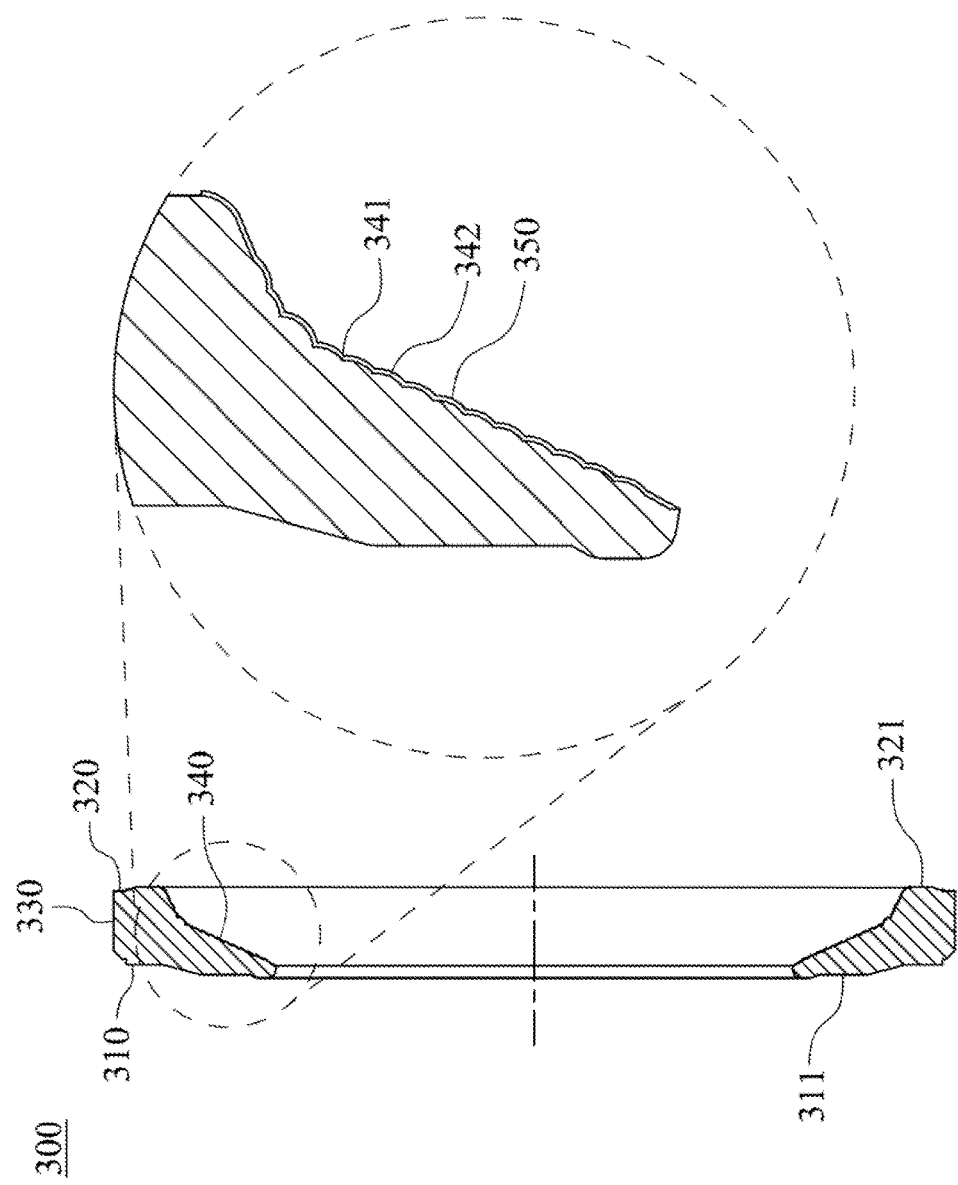
FIG. 3 is a cross-sectional schematic view of an annular optical spacer according to the 2nd example of the present disclosure.

FIG. 3 is a cross-sectional schematic view of an annular optical spacer 300 according to the 2nd example of the present disclosure. In FIG. 3, the annular optical spacer 300 includes a first side portion 310, a second side portion 320, an outer annular portion 330, an inner annular portion 340 and an anti-reflective layer 350. The second side portion 320 is opposite to the first side portion 310. The outer annular portion 330 connects the first side portion 310 with the second side portion 320. The inner annular portion 340 connects the first side portion 310 with the second side portion 320, and a vertical distance between the inner annular portion 340 and a central axis of the annular optical spacer 300 is shorter than a vertical distance between the outer annular portion 330 and the central axis of the annular optical spacer 300.

The first side portion 310 includes an abutting surface 311, and the abutting surface 311 is perpendicular to the central axis of the annular optical spacer 300.

The second side portion 320 includes an abutting surface 321, and the abutting surface 321 is perpendicular to the central axis of the annular optical spacer 300.

The inner annular portion 340 includes a rugged surface 341. The rugged surface 341 includes fourteen annular protruding structures 342. The annular protruding structures 342 are coaxially arranged around the central axis. The annular protruding structures 342 are integrated with the rugged surface 341. The annular protruding structures 342 are arc-shaped.

The anti-reflective layer 350 is on top of the rugged surface 341. The anti-reflective layer 350 includes 4 high refractive index films (not shown) and 4 low refractive index films (not shown), and the high refractive index films and the low refractive index films are alternately stacked. The high refractive index films are made of $TiO_2$, and the low refractive index films are made of $SiO_2$.

Furthermore, the rugged surface 341 is an atomized surface. The annular optical spacer 300 is made of opaque plastic material, and the annular optical spacer 300 is manufactured by an injection molding method. In a molding step of the injection molding method, the first side portion 310 is adjacent to a moving part of a mold, and the second side portion 320 is adjacent to a fixed part of the mold.

A maximum outer diameter of the annular optical spacer 300 is D1. A minimum inner diameter of the annular optical spacer 300 is D2. A radial length of the abutting surface 311 of the first side portion 310 is Lr1. A radial length of the abutting surface 321 of the second side portion 320 is Lr2. A distance between the abutting surface 311 of the first side portion 310 and the abutting surface 321 of the second side portion 320 in parallel with the central axis is ET. A maximum width of each of the annular protruding structures 342 is L. A curvature radius of each of the annular protruding structures 342 is R. A reflectivity of the anti-reflective layer 350 for light wavelengths between 400 nm and 700 nm is Ref. A refractive index of the high refractive index film is NA. A refractive index of the low refractive index film is NB.

The values of D1, D2, Lr1, Lr2, ET, L, R, L/R, D1/D2, Ref, NA and NB of the 2nd example are shown in Table 2.

TABLE 2

| 2nd example | | | |
|---|---|---|---|
| D1 (mm) | 5.10 | R (mm) | 0.05 |
| D2 (mm) | 3.12 | L/R | 0.80, 1.00, 1.36 |
| Lr1 (mm) | 0.29 | D1/D2 | 1.63 |
| Lr2 (mm) | 0.12 | Ref (%) | <2 |
| ET (mm) | 0.47 | NA | 2.34 |
| L (mm) | 0.04, 0.05, 0.068 | NB | 1.46 |

Figure 14:
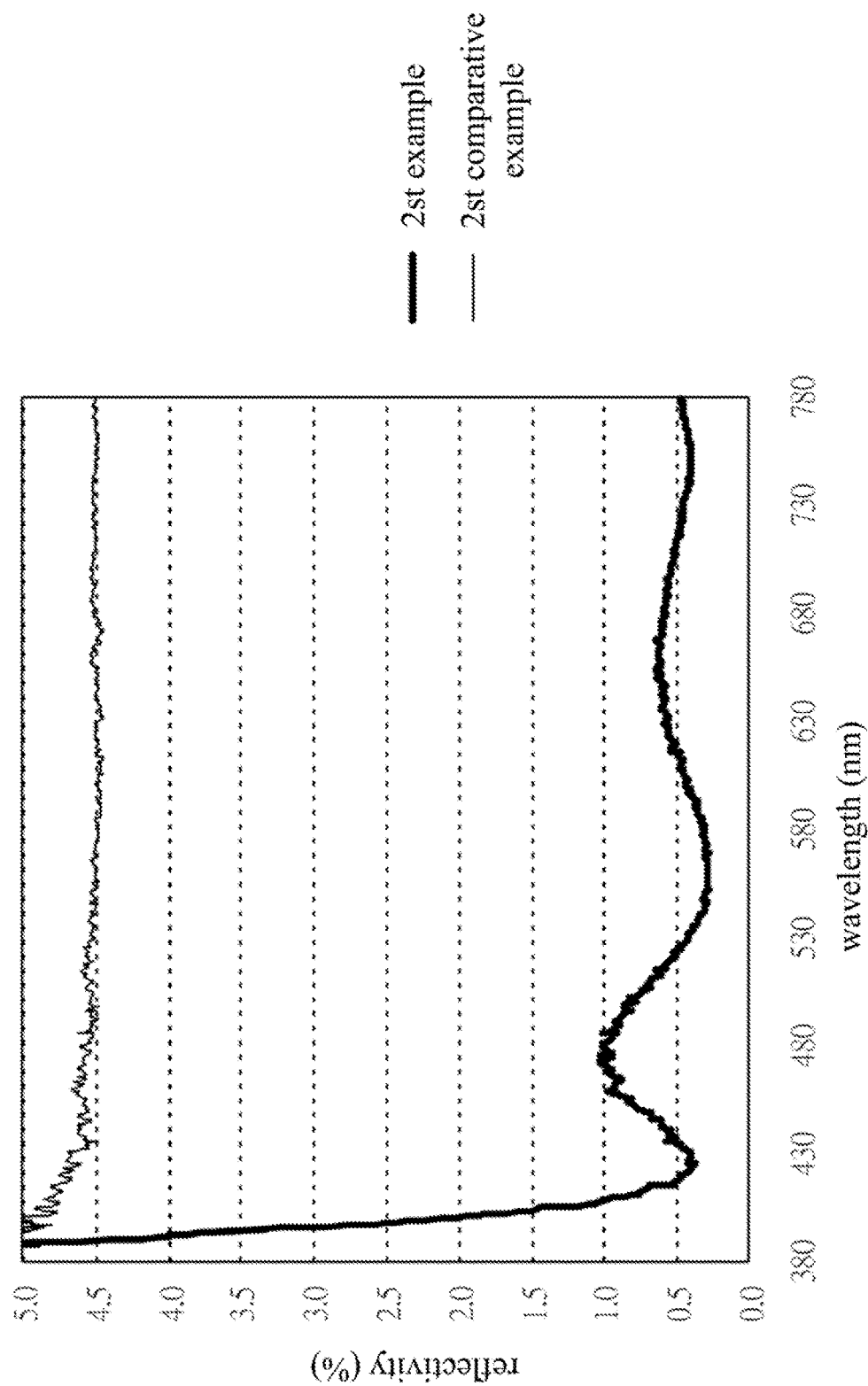
FIG. 14 shows relationships between reflectivity and wavelength of the annular optical spacer in FIG. 3 and an annular optical spacer of a 2nd comparative example.

FIG. 14 shows relationships between reflectivity and wavelength of the annular optical spacer 300 in FIG. 3 and an annular optical spacer according to the 2nd comparative example. The annular optical spacer according to the 2nd comparative example does not have the anti-reflective layer 350, and the other structures of the annular optical spacer according to the 2nd comparative example are the same as the annular optical spacer 300 according to the 2nd example. As shown in FIG. 14, when the wavelength range is between 400 nm and 700 nm, a reflectivity of the annular optical spacer 300 according to the 2nd example is lower than a reflectivity of the annular optical spacer according to the 2nd comparative example. Therefore, the unexpected lights which are visible for human eyes can be eliminated.

3Rd Example

Figure 4:
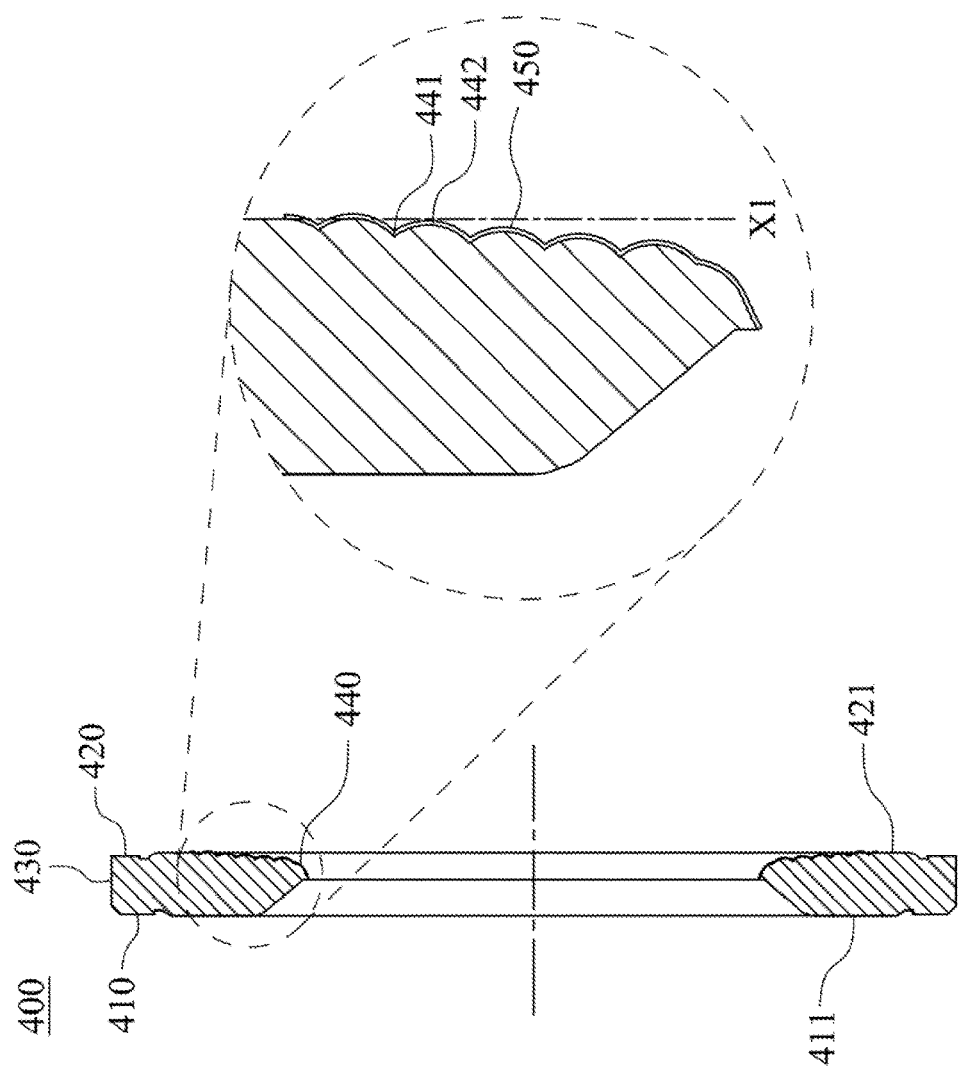
FIG. 4 is a cross-sectional schematic view of an annular optical spacer according to the 3rd example of the present disclosure.

FIG. 4 is a cross-sectional schematic view of an annular optical spacer 400 according to the 3rd example of the present disclosure. In FIG. 4, the annular optical spacer 400 includes a first side portion 410, a second side portion 420, an outer annular portion 430, an inner annular portion 440 and an anti-reflective layer 450. The second side portion 420 is opposite to the first side portion 410. The outer annular portion 430 connects the first side portion 410 with the second side portion 420. The inner annular portion 440 connects the first side portion 410 with the second side portion 420, and a vertical distance between the inner annular portion 440 and a central axis of the annular optical spacer 400 is shorter than a vertical distance between the outer annular portion 430 and the central axis of the annular optical spacer 400.

The first side portion 410 includes an abutting surface 411, and the abutting surface 411 is perpendicular to the central axis of the annular optical spacer 400.

The second side portion 420 includes an abutting surface 421, and the abutting surface 421 is perpendicular to the central axis of the annular optical spacer 400.

The inner annular portion 440 includes a rugged surface 441. A virtual reference line X1 is depicted for showing a relationship of the rugged surface 441 and the second side portion 420. The virtual reference line X1 is extended from a part of the second side portion 420 which is connected with the rugged surface 441, and the virtual reference line X1 and the part of the second side portion 420 are in the same horizontal plane. With the aid of the virtual reference line X1, it is obviously that the rugged surface 441 is connected with the second side portion 420 and is inclined inwardly. The rugged surface 441 includes six annular protruding structures 442. The annular protruding structures 442 are coaxially arranged around the central axis. The annular protruding structures 442 are integrated with the rugged surface 441. The annular protruding structures 442 are arc-shaped.

The anti-reflective layer 450 is on top of the rugged surface 441. The anti-reflective layer 450 includes 2 high refractive index films (not shown) and 2 low refractive index films (not shown), and the high refractive index films and the low refractive index films are alternately stacked. The high refractive index films are made of $TiO_2$, and the low refractive index films are made of $SiO_2$.

Furthermore, the rugged surface 441 is an atomized surface. The annular optical spacer 400 is made of opaque plastic material, and the annular optical spacer 400 is manufactured by an injection molding method. In a molding step of the injection molding method, the first side portion 410 is adjacent to a moving part of a mold, and the second side portion 420 is adjacent to a fixed part of the mold.

A maximum outer diameter of the annular optical spacer 400 is D1. A minimum inner diameter of the annular optical spacer 400 is D2. A radial length of the abutting surface 411 of the first side portion 410 is Lr1. A radial length of the abutting surface 421 of the second side portion 420 is Lr2. A distance between the abutting surface 411 of the first side portion 410 and the abutting surface 421 of the second side portion 420 in parallel with the central axis is ET. A maximum width of each of the annular protruding structures 442 is L. A curvature radius of each of the annular protruding structures 442 is R. A reflectivity of the anti-reflective layer 450 for light wavelengths between 400 nm and 700 nm is Ref. A refractive index of the high refractive index film is NA. A refractive index of the low efractive index film is NB.

The values of D1, D2, Lr1, Lr2, ET, L, R, L/R, D1/D2, Ref, NA and NB of the 3rd example are shown in Table 3.

TABLE 3

| 3rd example | | | |
|---|---|---|---|
| D1 (mm) | 3.04 | R (mm) | 0.05 |
| D2 (mm) | 1.62 | L/R | 1.00, 1.36 |
| Lr1 (mm) | 0.28 | D1/D2 | 1.88 |
| Lr2 (mm) | 0.11 | Ref (%) | <2 |
| ET (mm) | 0.23 | NA | 2.34 |
| L (mm) | 0.05, 0.068 | NB | 1.46 |

4Th Example

Figure 5:
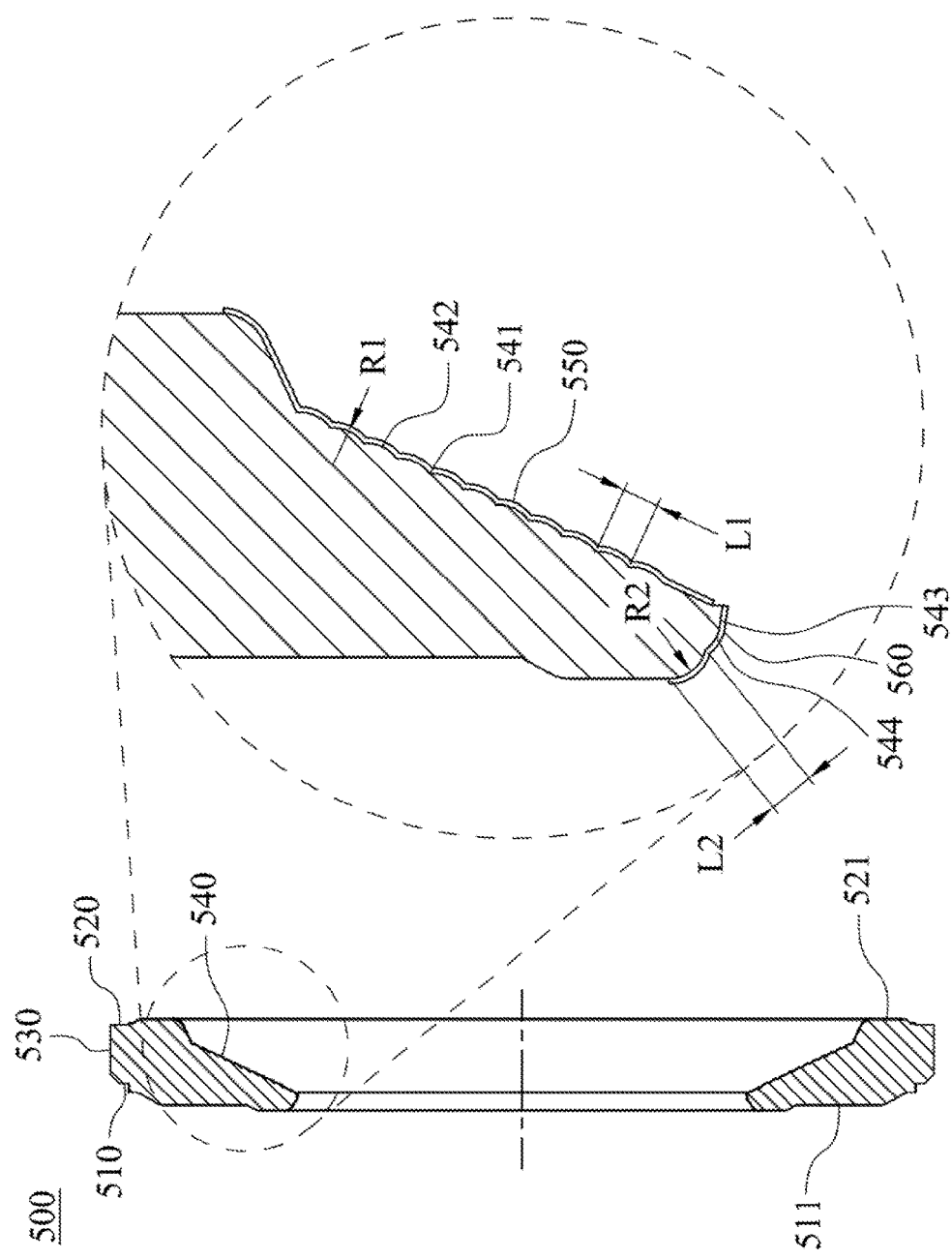
FIG. 5 is a cross-sectional schematic view of an annular optical spacer according to the 4th example of the present disclosure.

FIG. 5 is a cross-sectional schematic view of an annular optical spacer 500 according to the 4th example of the present disclosure. In FIG. 5, the annular optical spacer 500 includes a first side portion 510, a second side portion 520, an outer annular portion 530, an inner annular portion 540, an anti-reflective layer 550 and an anti-reflective layer 560. The second side portion 520 is opposite to the first side portion 510. The outer annular portion 530 connects the first side portion 510 with the second side portion 520. The inner annular portion 540 connects the first side portion 510 with the second side portion 520, and a vertical distance between the inner annular portion 540 and a central axis of the annular optical spacer 500 is shorter than a vertical distance between the outer annular portion 530 and the central axis of the annular optical spacer 500.

The first side portion 510 includes an abutting surface 511, and the abutting surface 511 is perpendicular to the central axis of the annular optical spacer 500.

The second side portion 520 includes an abutting surface 521, and the abutting surface 521 is perpendicular to the central axis of the annular optical spacer 500.

The inner annular portion 540 includes a rugged surface 541 and a rugged surface 543. The rugged surface 541 includes eleven annular protruding structures 542, and the annular protruding structures 542 are coaxially arranged around the central axis. The annular protruding structures 542 are integrated with the rugged surface 541. The rugged surface 543 includes two annular protruding structures 544, and the annular protruding structures 544 are coaxially arranged around the central axis. The annular protruding structures 544 are integrated with the rugged surface 543. The annular protruding structures 542 and the annular protruding structures 544 are arc-shaped.

The anti-reflective layer 550 is on top of the rugged surface 541. The anti-reflective layer 560 is on top of the rugged surface 543. Each of the anti-reflective layer 550 and the anti-reflective layer 560 includes 2 high refractive index films (not shown) and 2 low refractive index films (not shown), and the high refractive index films and the low refractive index films are alternately stacked. The high refractive index films are made of $TiO_2$, and the low refractive index films are made of $SiO_2$.

Furthermore, the rugged surface 541 and the rugged surface 543 are atomized surfaces. The annular optical spacer 500 is made of opaque plastic material, and the annular optical spacer 500 is manufactured by an injection molding method. In a molding step of the injection molding method, the first side portion 510 is adjacent to a moving part of a mold, and the second side portion 520 is adjacent to a fixed part of the mold.

A maximum outer diameter of the annular optical spacer 500 is D1. A minimum inner diameter of the annular optical spacer 500 is D2. A radial length of the abutting surface 511 of the first side portion 510 is Lr2. A radial length of the abutting surface 521 of the second side portion 520 is Lr2. A distance between the abutting surface 511 of the first side portion 510 and the abutting surface 521 of the second side portion 520 in parallel with the central axis is ET. A maximum width of each of the annular protruding structures 542 is L1. A curvature radius of each of the annular protruding structures 542 is R1. A maximum width of each of the annular protruding structures 544 is L2. A curvature radius of each of the annular protruding structures 544 is R2. A reflectivity of each of the anti-reflective layer 550 and the anti-reflective layer 560 for light wavelengths between 400 nm and 700 nm is Ref. A refractive index of the high refractive index film is NA. A refractive index of the low refractive index film is NB.

The values of D1, D2, Lr1, Lr2, ET, L1, R1, L1/R1, L2, R2, L2/R2, D1/D2, Ref, NA and NB of the 4th example are shown in Table 4.

TABLE 4

| 4th example | | | |
|---|---|---|---|
| D1 (mm) | 4.50 | L2 (mm) | 0.045, 0.064 |
| D2 (mm) | 2.45 | R2 (mm) | 0.05 |
| Lr1 (mm) | 0.47 | L2/R2 | 0.90, 1.28 |
| Lr2 (mm) | 0.17 | D1/D2 | 1.84 |
| ET (mm) | 0.47 | Ref (%) | <2 |
| L1 (mm) | 0.05 | NA | 2.34 |
| R1 (mm) | 0.05 | NB | 1.46 |
| L1/R1 | 1.00 | | |

5Th Example

Figure 6:
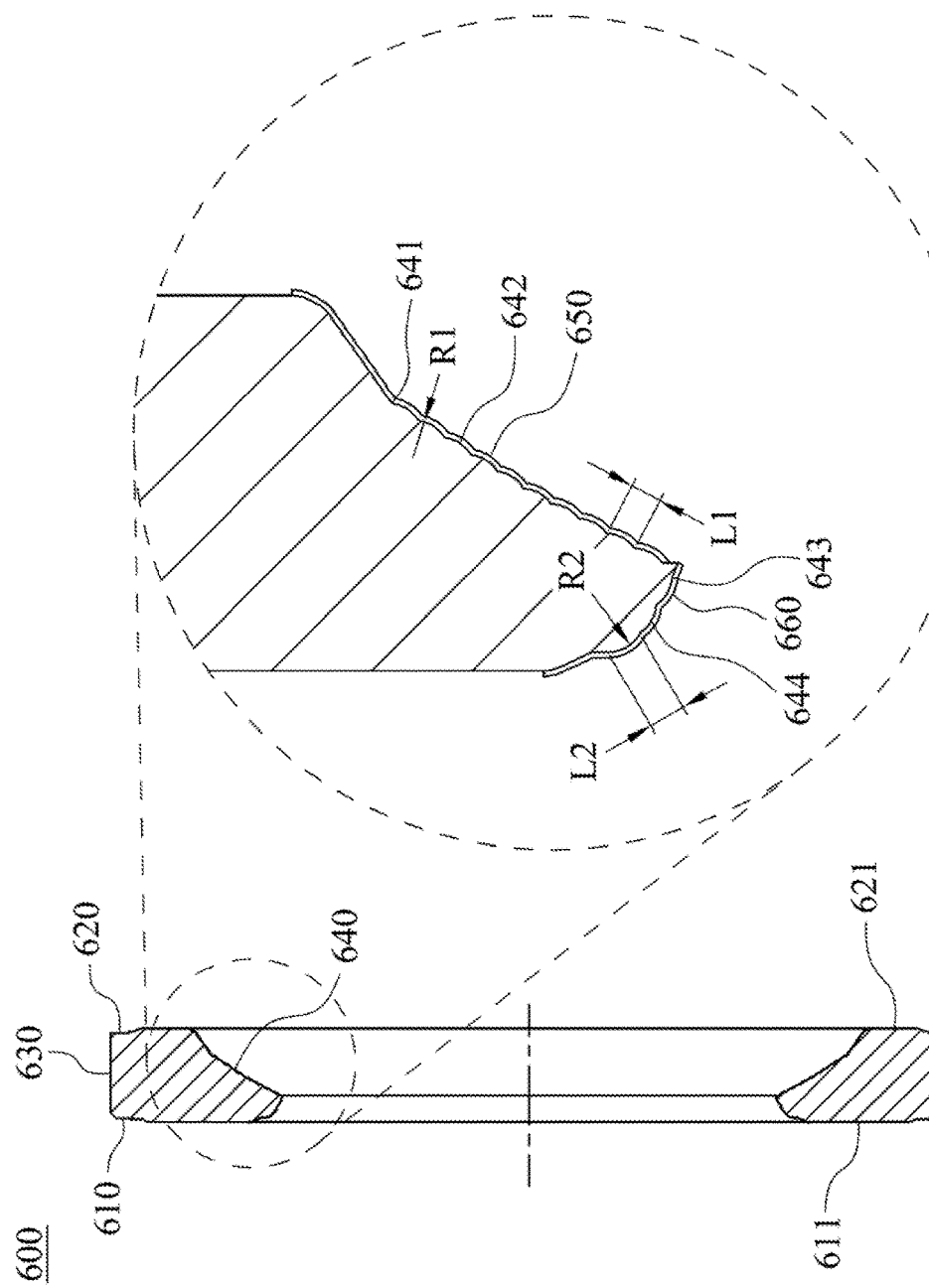
FIG. 6 is a cross-sectional schematic view of an annular optical spacer according to the 5th example of the present disclosure.

FIG. 6 is a cross-sectional schematic view of an annular optical spacer 600 according to the 5th example of the present disclosure. In FIG. 6, the annular optical spacer 600 includes a first side portion 610, a second side portion 620, an outer annular portion 630, an inner annular portion 640, an anti-reflective layer 650 and an anti-reflective layer 660.

The second side portion 620 is opposite to the first side portion 610. The outer annular portion 630 connects the first side portion 610 with the second side portion 620. The inner annular portion 640 connects the first side portion 610 with the second side portion 620, and a vertical distance between the inner annular portion 640 and a central axis of the annular optical spacer 600 is shorter than a vertical distance between the outer annular portion 630 and the central axis of the annular optical spacer 600.

The first side portion 610 includes an abutting surface 611, and the abutting surface 611 is perpendicular to the central axis of the annular optical spacer 600.

The second side portion 620 includes an abutting surface 621, and the abutting surface 621 is perpendicular to the central axis of the annular optical spacer 600.

The inner annular portion 640 includes a rugged surface 641 and a rugged surface 643. The rugged surface 641 includes ten annular protruding structures 642, and the annular protruding structures 642 are coaxially arranged around the central axis. The annular protruding structures 642 are integrated with the rugged surface 641. The rugged surface 643 includes three annular protruding structures 644, and the annular protruding structures 644 are coaxially arranged around the central axis. The annular protruding structures 644 are integrated with the rugged surface 643. The annular protruding structures 642 and the annular protruding structures 644 are arc-shaped.

The anti-reflective layer 650 is on top of the rugged surface 641. The anti-reflective layer 660 is on top of the rugged surface 643. Each of the anti-reflective layer 650 and the anti-reflective layer 660 includes 2 high refractive index films (not shown) and 2 low refractive index films (not shown), and the high refractive index films and the low refractive index films are alternately stacked. The high refractive index films are made of $TiO_2$ and the low refractive index films are made of $SiO_2$.

Furthermore, the rugged surface 641 and the rugged surface 643 are atomized surfaces. The annular optical spacer 600 is made of opaque plastic material, and the annular optical spacer 600 is manufactured by an injection molding method. In a molding step of the injection molding method, the first side portion 610 is adjacent to a moving part of a mold, and the second side portion 620 is adjacent to a fixed part of the mold.

A maximum outer diameter of the annular optical spacer 600 is D1. A minimum inner diameter of the annular optical spacer 600 is D2. A radial length of the abutting surface 611 of the first side portion 610 is Lr1. A radial length of the abutting surface 621 of the second side portion 620 is Lr2. A distance between the abutting surface 611 of the first side portion 610 and the abutting surface 621 of the second side portion 620 in parallel with the central axis is ET. A maximum width of each of the annular protruding structures 642 is L1. A curvature radius of each of the annular protruding structures 642 is R1. A maximum width of each of the annular protruding structures 644 is L2. A curvature radius of each of the annular protruding structures 644 is R2. A reflectivity of each of the anti-reflective layer 650 and the anti-reflective layer 660 for light wavelengths between 400 nm and 700 nm is Ref. A refractive index of the high refractive index film is NA. A refractive index of the low refractive index film is NB.

The values of D1, D2, Lr1, Lr2, ET, L1, R1, L1/R1, L2, R2, L2/R2, D1/D2, Ref, NA and NB of the 5th example are shown in Table 5.

TABLE 5

| 5th example | | | |
|---|---|---|---|
| D1 (mm) | 4.50 | L2 (mm) | 0.04, 0.05 |
| D2 (mm) | 2.65 | R2 (mm) | 0.05 |
| Lr1 (mm) | 0.53 | L2/R2 | 0.80, 1.00 |
| Lr2 (mm) | 0.24 | D1/D2 | 1.70 |
| ET (mm) | 0.51 | Ref (%) | <2 |
| L1 (mm) | 0.04 | NA | 2.34 |
| R1 (mm) | 0.05 | NB | 1.46 |
| L1/R1 | 0.80 | | |

6Th Example

Figure 7:
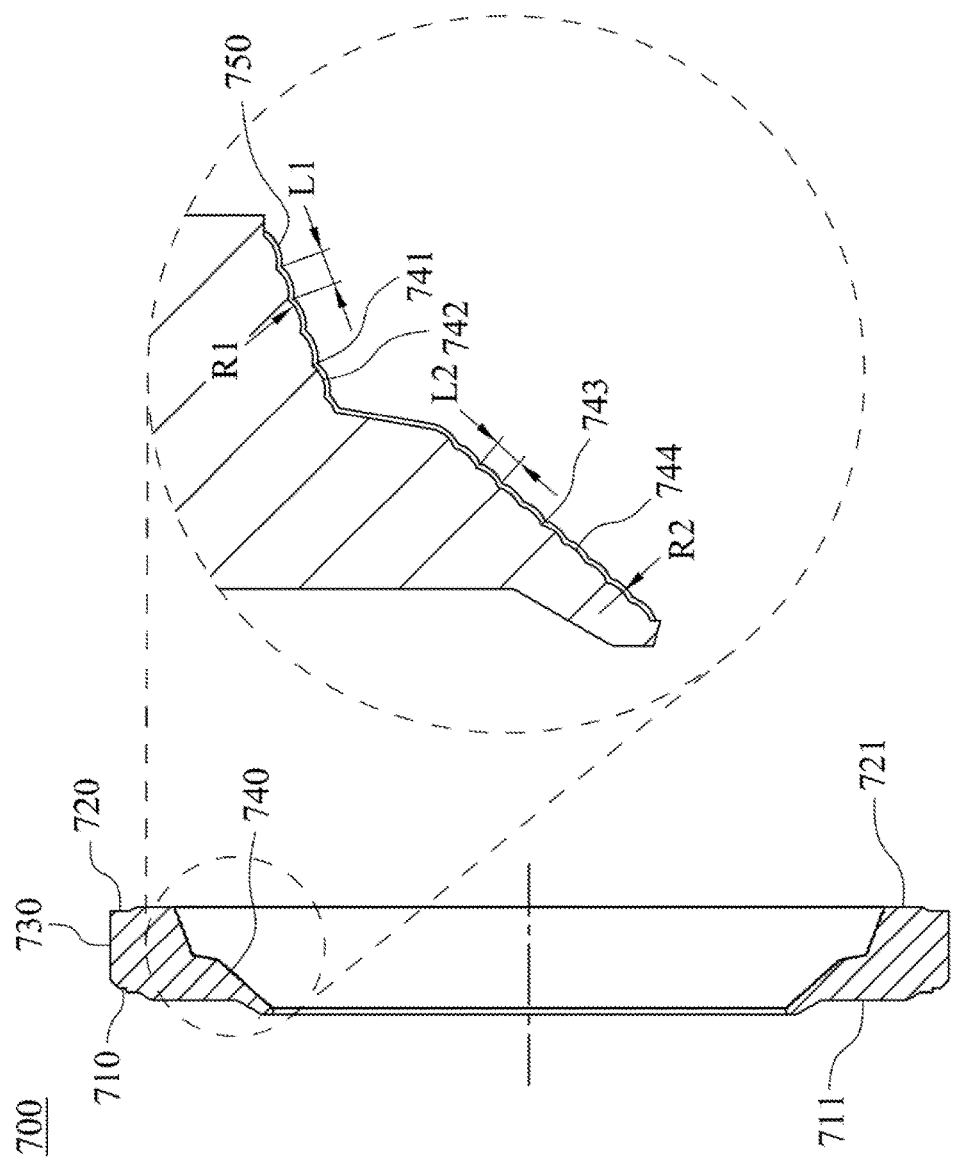
FIG. 7 is a cross-sectional schematic view of an annular optical spacer according to the 6th example of the present disclosure.

FIG. 7 is a cross-sectional schematic view of an annular optical spacer 700 according to the 6th example of the present disclosure. In FIG. 7, the annular optical spacer 700 includes a first side portion 710, a second side portion 720, an outer annular portion 730, an inner annular portion 740 and an anti-reflective layer 750. The second side portion 720 is opposite to the first side portion 710. The outer annular portion 730 connects the first side portion 710 with the second side portion 720. The inner annular portion 740 connects the first side portion 710 with the second side portion 720, and a vertical distance between the inner annular portion 740 and a central axis of the annular optical spacer 700 is shorter than a vertical distance between the outer annular portion 730 and the central axis of the annular optical spacer 700.

The first side portion 710 includes an abutting surface 711, and the abutting surface 711 is perpendicular to the central axis of the annular optical spacer 700.

The second side portion 720 includes an abutting surface 721, and the abutting surface 721 is perpendicular to the central axis of the annular optical spacer 700.

The inner annular portion 740 includes a rugged surface 741 and a rugged surface 743. The rugged surface 741 includes six annular protruding structures 742, and the annular protruding structures 742 are coaxially arranged around the central axis. The annular protruding structures 742 are integrated with the rugged surface 741. The rugged surface 743 includes ten annular protruding structures 744, and the annular protruding structures 744 are coaxially arranged around the central axis. The annular protruding structures 744 are integrated with the rugged surface 743. The annular protruding structures 742 and the annular protruding structures 744 are arc-shaped.

The anti-reflective layer 750 is on top of the rugged surface 741 and the rugged surface 743. The anti-reflective layer 750 includes 4 high refractive index films (not shown) and 4 low refractive index films (not shown), and the high refractive index films and the low refractive index films are alternately stacked. The high refractive index films are made of $TiO_2$, and the low refractive index films are made of $SiO_2$.

Furthermore, the rugged surface 741 and the rugged surface 743 are atomized surfaces. The annular optical spacer 700 is made of opaque plastic material, and the annular optical spacer 700 is manufactured by an injection molding method, in a molding step of the injection molding method, the first side portion 710 is adjacent to a moving part of a mold, and the second side portion 720 is adjacent to a fixed part of the mold.

A maximum outer diameter of the annular optical spacer 700 is D1. A minimum inner diameter of the annular optical spacer 700 is D2. A radial length of the abutting surface 711 of the first side portion 710 is Lr1. A radial length of the abutting surface 721 of the second side portion 720 is Lr2. A distance between the abutting surface 711 of the first side portion 710 and the abutting surface 721 of the second side portion 720 in parallel with the central axis is ET. A maximum width of each of the annular protruding structures 742 is L1. A curvature radius of each of the annular protruding structures 742 is R1. A maximum width of each of the annular protruding structures 744 is L2. A curvature radius of each of the annular protruding structures 744 is R2. A reflectivity of the anti-reflective layer 750 for light wavelengths between 400 nm and 700 nm is Ref. A refractive index of the high refractive index film is NA. A refractive index of the low refractive index film is NB.

The values of D1, D2, Lr1, Lr2, ET, L1, R1, L1/R1, L2, R2, L2/R2, D1/D2, Ref, NA and NB of the 6th example are shown in Table 6.

TABLE 6

| 6th example | | | |
|---|---|---|---|
| D1 (mm) | 5.25 | L2 (mm) | 0.05 |
| D2 (mm) | 3.2 | R2 (mm) | 0.05 |
| Lr1 (mm) | 0.52 | L2/R2 | 1.00 |
| Lr2 (mm) | 0.24 | D1/D2 | 1.64 |
| ET (mm) | 0.59 | Ref (%) | <2 |
| L1 (mm) | 0.03, 0.05 | NA | 2.34 |
| R1 (mm) | 0.05 | NB | 1.46 |
| L1/R1 | 0.60, 1.00 | | |

7Th Example

Figure 8:
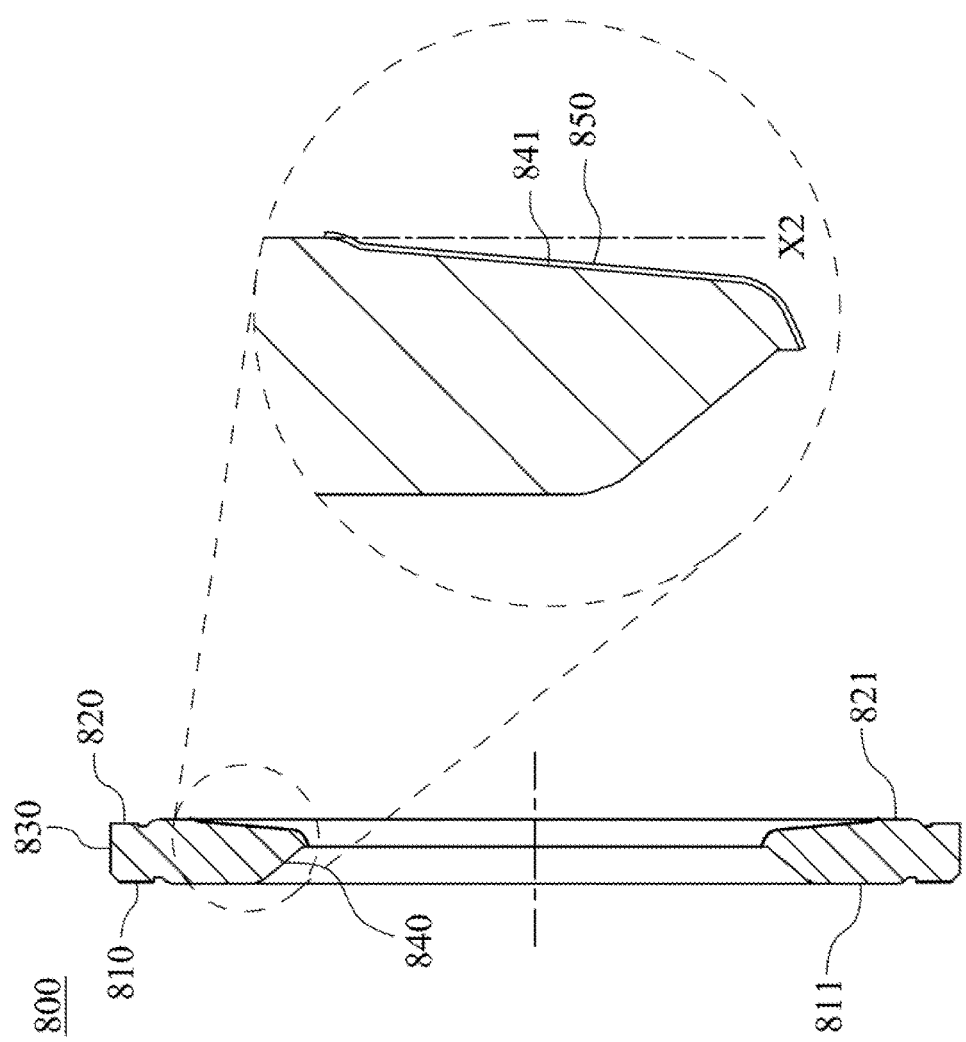
FIG. 8 is a cross-sectional schematic view of an annular optical spacer according to the 7th example of the present disclosure.

FIG. 8 is a cross-sectional schematic view of an annular optical spacer 800 according to the 7th example of the present disclosure. In FIG. 8, the annular optical spacer 800 includes a first side portion 810, a second side portion 820, an outer annular portion 830, an inner annular portion 840 and an anti-reflective layer 850. The second side portion 820 is opposite to the first side portion 810. The outer annular portion 830 connects the first side portion 810 with the second side portion 820. The inner annular portion 840 connects the first side portion 810 with the second side portion 820, and a vertical distance between the inner annular portion 840 and a central axis of the annular optical spacer 800 is shorter than a vertical distance between the outer annular portion 830 and the central axis of the annular optical spacer 800.

The first side portion 810 includes an abutting surface 811, and the abutting surface 811 is perpendicular to the central axis of the annular optical spacer 800.

The second side portion 820 includes an abutting surface 821, and the abutting surface 821 is perpendicular to the central axis of the annular optical spacer 800.

The inner annular portion 840 includes a surface 841. A virtual reference line X2 is depicted for showing a relationship of the surface 841 and the second side portion 820. The virtual reference line X2 is extended from a part of the second side portion 820 which is connected with the surface 841, and the virtual reference line X2 and the part of the second side portion 820 are in the same horizontal plane. With the aid of the virtual reference line X2, it is obviously that the surface 841 is connected with the second side portion 820 and is inclined inwardly.

The anti-reflective layer 850 is on top of the surface 841. The anti-reflective layer 850 includes 4 high refractive index films (not shown) and 4 low refractive index films (not shown), and the high refractive index films and the low refractive index films are alternately stacked. The high refractive index films are made of $TiO_2$, and the low refractive index films are made of $SiO_2$.

Furthermore, the surface 841 is an atomized surface. The annular optical spacer 800 is made of opaque plastic material, and the annular optical spacer 800 is manufactured by an injection molding method. In a molding step of the injection molding method, the first side portion 810 is adjacent to a moving part of a mold, and the second side portion 820 is adjacent to a fixed part of the mold.

A maximum outer diameter of the annular optical spacer 800 is D1. A minimum inner diameter of the annular optical spacer 800 is D2. A radial length of the abutting surface 811 of the first side portion 810 is Lr1. A radial length of the abutting surface 821 of the second side portion 820 is Lr2. A distance between the abutting surface 811 of the first side portion 810 and the abutting surface 821 of the second side portion 820 in parallel with the central axis is ET. A reflectivity of the anti-reflective layer 850 for light wavelengths between 400 nm and 700 nm is Ref. A refractive index of the high refractive index film is NA. A refractive index of the low refractive index film is NB.

The values of D1, D2, Lr1, Lr2, ET, D1/D2, Ref, NA and NB of the 7th example are shown in Table 7.

TABLE 7

| 7th example | | | |
|---|---|---|---|
| D1 (mm) | 3.04 | D1/D2 | 1.88 |
| D2 (mm) | 1.62 | Ref (%) | <2 |
| Lr1 (mm) | 0.28 | NA | 2.34 |
| Lr2 (mm) | 0.11 | NB | 1.46 |
| ET (mm) | 0.23 | | |

8Th Example

Figure 9:
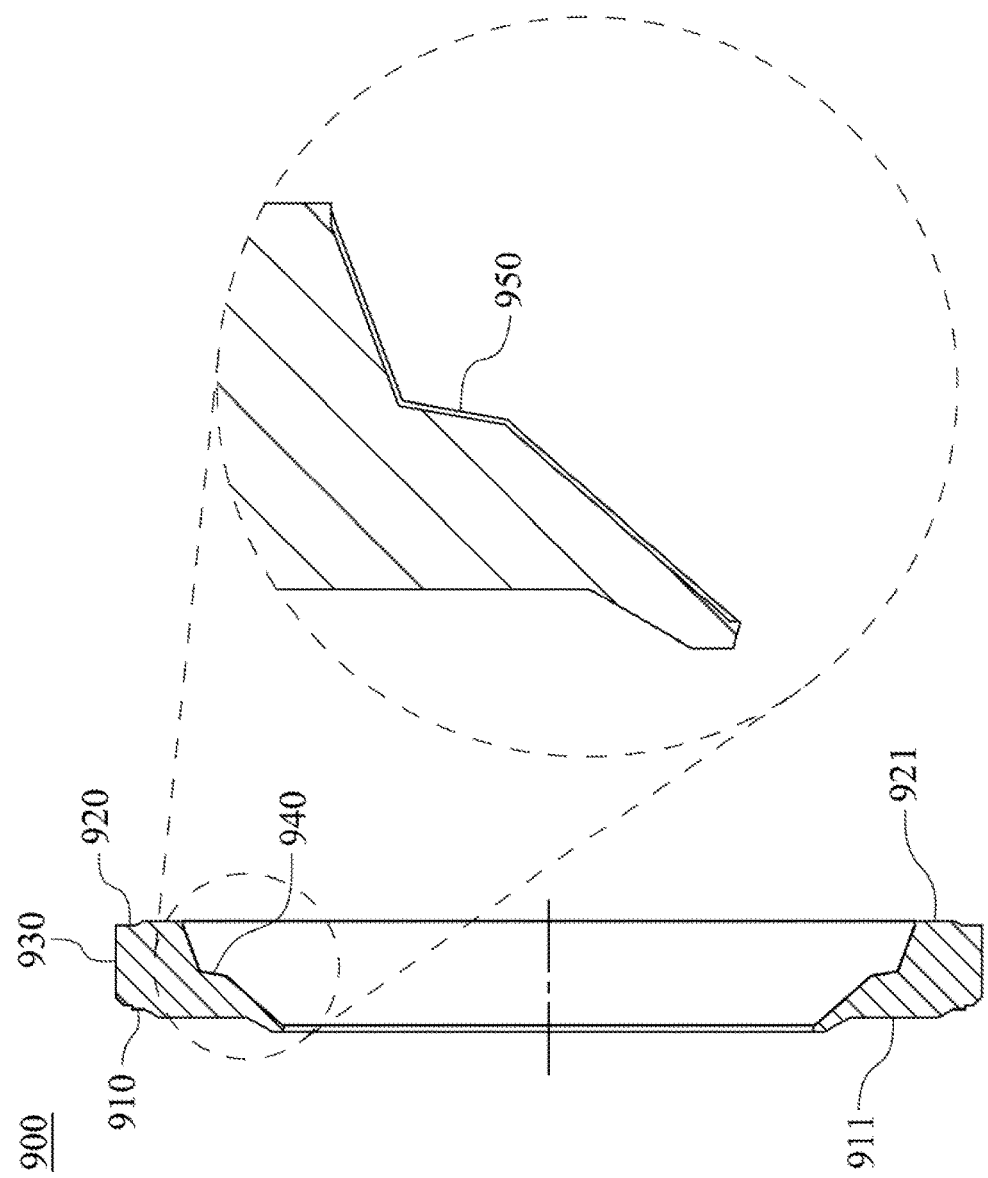
FIG. 9 is a cross-sectional schematic view of an annular optical spacer according to the 8th example of the present disclosure.

FIG. 9 is a cross-sectional schematic view of an annular optical spacer 900 according to the 8th example of the present disclosure. In FIG. 9, the annular optical spacer 900 includes a first side portion 910, a second side portion 920, an outer annular portion 930, an inner annular portion 940 and an anti-reflective layer 950. The second side portion 920 is opposite to the first side portion 910. The outer annular portion 930 connects the first side portion 910 with the second side portion 920. The inner annular portion 940 connects the first side portion 910 with the second side portion 920, and a vertical distance between the inner annular portion 940 and a central axis of the annular optical spacer 900 is shorter than a vertical distance between the outer annular portion 930 and the central axis of the annular optical spacer 900.

The first side portion 910 includes an abutting surface 911, and the abutting surface 911 is perpendicular to the central axis of the annular optical spacer 900.

The second side portion 920 includes an abutting surface 921, and the abutting surface 921 is perpendicular to the central axis of the annular optical spacer 900.

The anti-reflective layer 950 is on top of the inner annular portion 940. The anti-reflective layer 950 includes 4 high refractive index films (not shown) and 4 low refractive index films (not shown), and the high refractive index films and the low refractive index films are alternately stacked. The high refractive index films are made of $TiO_2$, and the low refractive index films are made of $SiO_2$.

Furthermore, the inner annular portion 940 has an atomized surface (its reference numeral is omitted). The annular optical spacer 900 is made of opaque plastic material, and the annular optical spacer 900 is manufactured by an injection molding method. In a molding step of the injection molding method, the first side portion 910 is adjacent to a moving part of a mold, and the second side portion 920 is adjacent to a fixed part of the mold.

A maximum outer diameter of the annular optical spacer 900 is D1. A minimum inner diameter of the annular optical spacer 900 is D2. A radial length of the abutting surface 911 of the first side portion 910 is Lr1. A radial length of the abutting surface 921 of the second side portion 920 is Lr2. A distance between the abutting surface 911 of the first side portion 910 and the abutting surface 921 of the second side portion 920 in parallel with the central axis is ET. A reflectivity of the anti-reflective layer 950 for light wavelengths between 400 nm and 700 nm is Ref. A refractive index of the high refractive index film is NA. A refractive index of the low refractive index film is NB.

The values of D1, D2, Lr1, Lr2, ET, D1/D2, Ref, NA and NB of the 8th example are shown in Table 8.

TABLE 8

| 8th example | | | |
|---|---|---|---|
| D1 (mm) | 5.25 | D1/D2 | 1.64 |
| D2 (mm) | 3.2 | Ref (%) | <2 |
| Lr1 (mm) | 0.52 | NA | 2.34 |
| Lr2 (mm) | 0.24 | NB | 1.46 |
| ET (mm) | 0.59 | | |

9Th Example

Figure 10:
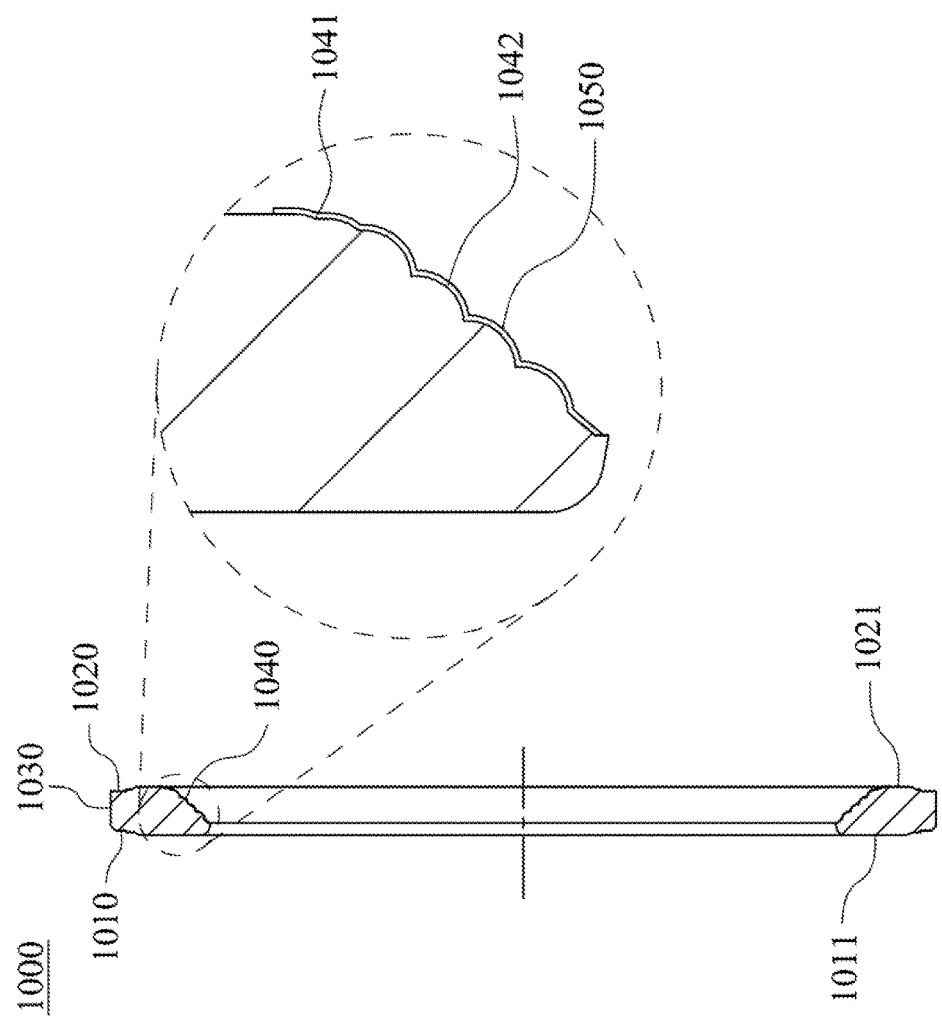
FIG. 10 is a cross-sectional schematic view of an annular optical pacer according to the 9th example of the present disclosure.

FIG. 10 is a cross-sectional schematic view of an annular optical spacer 1000 according to the 9th example of the present disclosure. In FIG. 10, the annular optical spacer 1000 includes a first side portion 1010, a second side portion 1020, an outer annular portion 1030, an inner annular portion 1040 and an anti-reflective layer 1050. The second side portion 1020 is opposite to the first side portion 1010. The outer annular portion 1030 connects the first side portion 1010 with the second side portion 1020. The inner annular portion 1040 connects the first side portion 1010 with the second side portion 1020, and a vertical distance between the inner annular portion 1040 and a central axis of the annular optical spacer 1000 is shorter than a vertical distance between the outer annular portion 1030 and the central axis of the annular optical spacer 1000.

The first side portion 1010 includes an abutting surface 1011, and the abutting surface 1011 is perpendicular to the central axis of the annular optical spacer 1000.

The second side portion 1020 includes an abutting surface 1021, and the abutting surface 1021 is perpendicular to the central axis of the annular optical spacer 1000.

The inner annular portion 1040 includes a rugged surface 1041. The rugged surface 1041 includes five annular protruding structures 1042, and the annular protruding structures 1042 are coaxially arranged around the central axis. The annular protruding structures 1042 are integrated with the rugged surface 1041. The annular protruding structures 1042 are arc-shaped.

The anti-reflective layer 1050 is on top of the rugged surface 1041. The anti-reflective layer 1050 includes 4 high refractive index films (not shown) and 4 low refractive index films (not shown), and the high refractive index films and the low refractive index films are alternately stacked. The high refractive index films are made of $TiO_2$, and the low refractive index films are made of $SiO_2$.

Furthermore, the rugged surface 1041 is an atomized surface. The annular optical spacer 1000 is made of opaque plastic material, and the annular optical spacer 1000 is manufactured by an injection molding method. In a molding step of the injection molding method, the first side portion 1010 is adjacent to a moving part of a mold, and the second side portion 1020 is adjacent to a fixed part of the mold.

A maximum outer diameter of the annular optical spacer 1000 is D1. A minimum inner diameter of the annular optical spacer 1000 is D2. A radial length of the abutting surface 1011 of the first side portion 1010 is Lr1. A radial length of the abutting surface 1021 of the second side portion 1020 is Lr2. A distance between the abutting surface 1011 of the first side portion 1010 and the abutting surface 1021 of the second side portion 1020 in parallel with the central axis is ET. A maximum width of each of the annular protruding structures 1042 is L. A curvature radius of each of the annular protruding structures 1042 is R. A reflectivity of the anti-reflective layer 1050 for light wavelengths between 400 nm and 700 nm is Ref. A refractive index of the high refractive index film is NA. A refractive index of the low refractive index film is NB.

The values of D1, D2, Lr1, Lr2, ET, L, R, L/R, D1/D2, Ref, NA and NB of the 9 th example are shown in Table 9.

TABLE 9

| 9th example | | | |
|---|---|---|---|
| D1 (mm) | 5.35 | R (mm) | 0.05 |
| D2 (mm) | 4.05 | L/R | 0.80, 1.40 |
| Lr1 (mm) | 0.39 | D1/D2 | 1.32 |
| Lr2 (mm) | 0.15 | Ref (%) | <2 |
| ET (mm) | 0.31 | NA | 2.34 |
| L (mm) | 0.04, 0.07 | NB | 1.46 |

10Th Example

Figure 11:
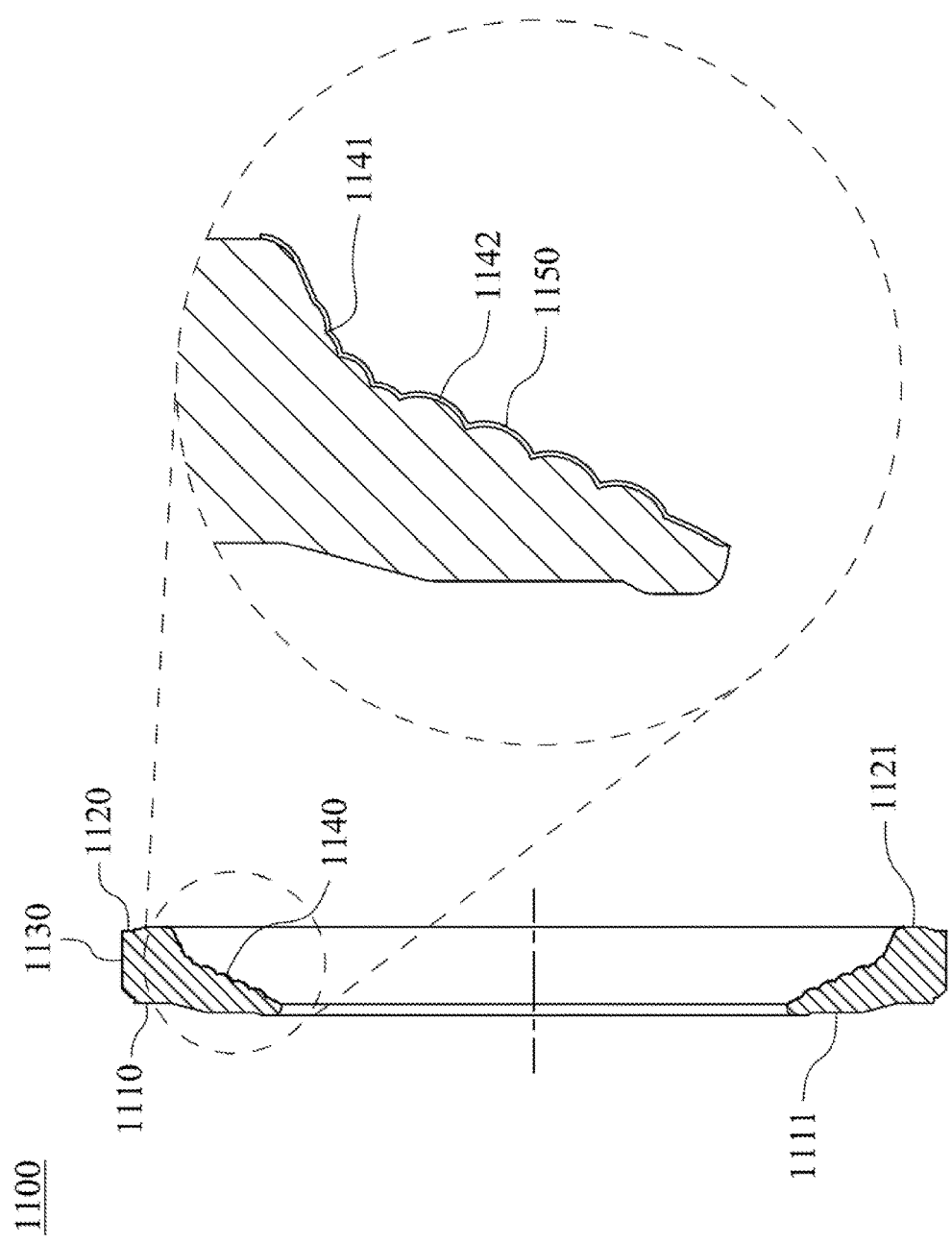
FIG. 11 is a cross-sectional schematic view of an annular optical spacer according to the 10th example of the present disclosure.

FIG. 11 is a cross-sectional schematic view of an annular optical spacer 1100 according to the 10th example of the present disclosure. In FIG. 11, the annular optical spacer 1100 includes a first side portion 1110, a second side portion 1120, an outer annular portion 1130, an inner annular portion 1140 and an anti-reflective layer 1150. The second side portion 1120 is opposite to the first side portion 1110. The outer annular portion 1130 connects the first side portion 1110 with the second side portion 1120. The inner annular portion 1140 connects the first side portion 1110 with the second side portion 1120, and a vertical distance between the inner annular portion 1140 and a central axis of the annular optical spacer 1100 is shorter than a vertical distance between the outer annular portion 1130 and the central axis of the annular optical spacer 1100.

The first side portion 1110 includes an abutting surface 1111, and the abutting surface 1111 is perpendicular to the central axis of the annular optical spacer 1100.

The second side portion 1120 includes an abutting surface 1121, and the abutting surface 1121 is perpendicular to the central axis of the annular optical spacer 1100.

The inner annular portion 1140 includes a rugged surface 1141. The rugged surface 1141 includes eight annular protruding structures 1142, and the annular protruding structures 1142 are coaxially arranged around the central axis.

The annular protruding structures 1142 are integrated with the rugged surface 1141. The annular protruding structures 1142 are arc-shaped.

The anti-reflective layer 1150 is on top of the rugged surface 1141. The anti-reflective layer 1150 includes 4 high refractive index films (not shown) and 4 low refractive index films (not shown), and the high refractive index films and the low refractive index films are alternately stacked. The high refractive index films are made of $TiO_2$, and the low refractive index films are made of $SiO_2$.

Furthermore, the rugged surface 1141 is an atomized surface. The annular optical spacer 1100 is made of opaque plastic material, and the annular optical spacer 1100 is manufactured by an injection molding method. In a molding step of the injection molding method, the first side portion 1110 is adjacent to a moving part of a mold, and the second side portion 1120 is adjacent to a fixed part of the mold.

A maximum outer diameter of the annular optical spacer 1100 is D1. A minimum inner diameter of the annular optical spacer 1100 is D2. A radial length of the abutting surface 1111 of the first side portion 1110 is Lr1. A radial length of the abutting surface 1121 of the second side portion 1120 is Lr2. A distance between the abutting surface 1111 of the first side portion 1110 and the abutting surface 1121 of the second side portion 1120 in parallel with the central axis is ET. A maximum width of each of the annular protruding structures 1142 is L. A curvature radius of each of the annular protruding structures 1142 is R. A reflectivity of the anti-reflective layer 1150 for light wavelengths between 400 nm and 700 nm is Ref. A refractive index of the high refractive index film is NA. A refractive index of the low refractive index film is NB.

The values of D1, D2, Lr1, Lr2, ET, L, R, L/R, D1/D2, Ref, NA and NB of the 10th example are shown in Table 10.

TABLE 10

| 10th example | | | |
|---|---|---|---|
| D1 (mm) | 5.10 | R (mm) | 0.05, 0.08 |
| D2 (mm) | 3.12 | L/R | 0.80, 1.00, 1.375 |
| Lr1 (mm) | 0.29 | D1/D2 | 1.63 |
| Lr2 (mm) | 0.12 | Ref (%) | <2 |
| ET (mm) | 0.47 | NA | 2.34 |
| L (mm) | 0.04, 0.05, 0.11 | NB | 1.46 |

11Th Example

Figure 12:
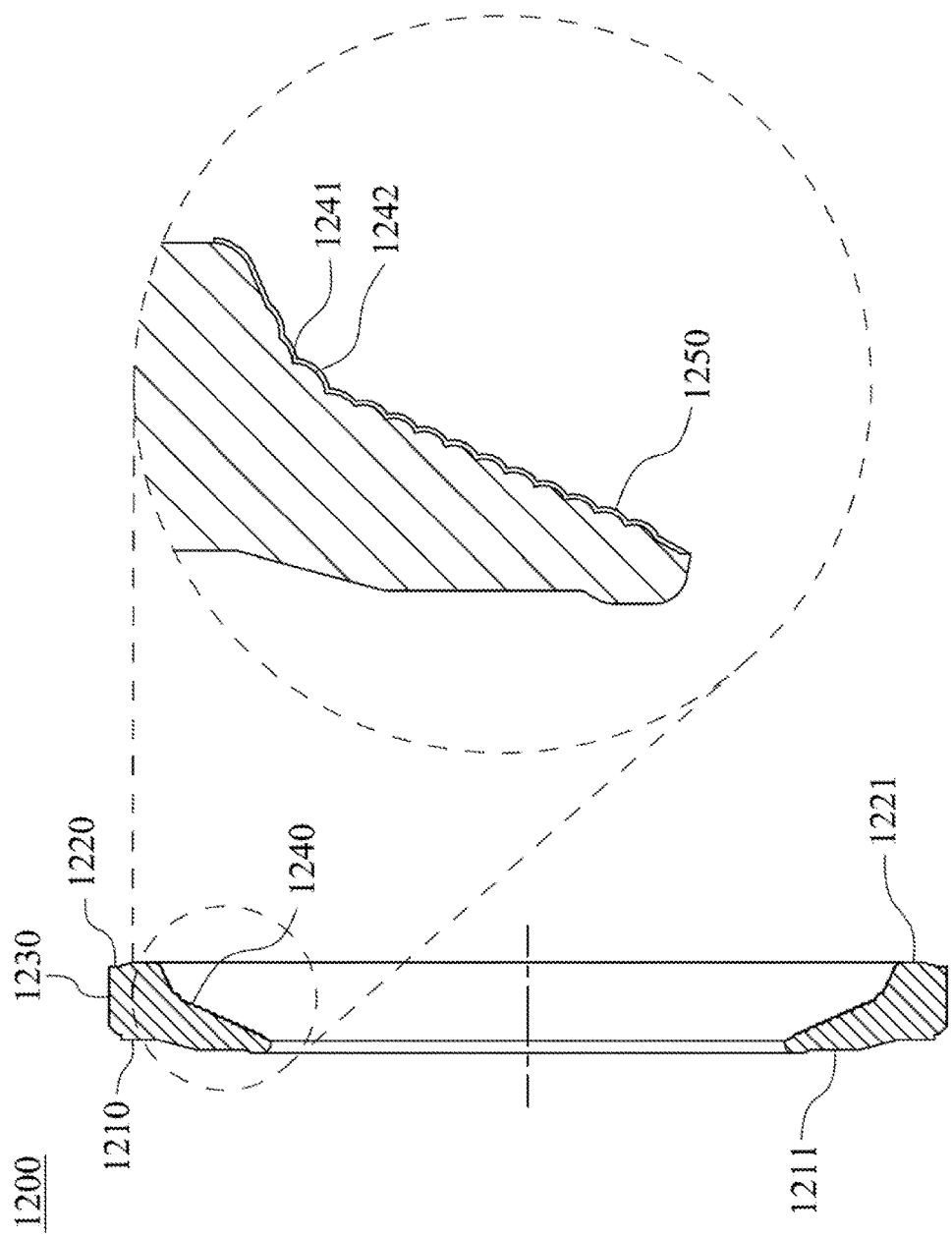
FIG. 12 is a cross-sectional schematic view of an annular optical spacer according to the 11th example of the present disclosure.

FIG. 12 is a cross-sectional schematic view of an annular optical spacer 1200 according to the 11th example of the present disclosure. In FIG. 12, the annular optical spacer 1200 includes a first side portion 1210, a second side portion 1220, an outer annular portion 1230, an inner annular portion 1240 and an anti-reflective layer 1250. The second side portion 1220 is opposite to the first side portion 1210. The outer annular portion 1230 connects the first side portion 1210 with the second side portion 1220. The inner annular portion 1240 connects the first side portion 1210 with the second side portion 1220, and a vertical distance between the inner annular portion 1240 and a central axis of the annular optical spacer 1200 is shorter than a vertical distance between the outer annular portion 1230 and the central axis of the annular optical spacer 1200.

The first side portion 1210 includes an abutting surface 1211, and the abutting surface 1211 is perpendicular to the central axis of the annular optical spacer 1200.

The second side portion 1220 includes an abutting surface 1221, and the abutting surface 1221 is perpendicular to the central axis of the annular optical spacer 1200.

The inner annular portion 1240 includes a rugged surface 1241. The rugged surface 1241 includes fourteen annular protruding structures 1242, and the annular protruding structures 1242 are coaxially arranged around the central axis. The annular protruding structures 1242 are integrated with the rugged surface 1241. The annular protruding structures 1242 are arc-shaped.

The anti-reflective layer 1250 is on top of the rugged surface 1241. The anti-reflective layer 1250 includes 4 high refractive index films (not shown) and 4 low refractive index films (not shown), and the high refractive index films and the low refractive index films are alternately stacked. The high refractive index films are made of $TiO_2$, and the low refractive index films are made of $SiO_2$.

Furthermore, the rugged surface 1241 is an atomized surface. The annular optical spacer 1200 is made of opaque plastic material, and the annular optical spacer 1200 is manufactured by an injection molding method. In a molding step of the injection molding method, the first side portion 1210 is adjacent to a moving part of a mold, and the second side portion 1220 is adjacent to a fixed part of the mold.

A maximum outer diameter of the annular optical spacer 1200 is D1. A minimum inner diameter of the annular optical spacer 1200 is D2. A radial length of the abutting surface 1211 of the first side portion 1210 is Lr1. A radial length of the abutting surface 1221 of the second side portion 1220 is Lr2. A distance between the abutting surface 1211 of the first side portion 1210 and the abutting surface 1221 of the second side portion 1220 in parallel with the central axis is ET. A maximum width of each of the annular protruding structures 1242 is L. A curvature radius of each of the annular protruding structures 1242 is R. A reflectivity of the anti-reflective layer 1250 for light wavelengths between 400 nm and 700 nm is Ref. A refractive index of the high refractive index film is NA. A refractive index of the low refractive index film is NB.

The values of D1, D2, Lr1, Lr2, ET, L, R, L/R, D1/D2, Ref, NA and NB of the 11th example are shown in Table 11.

TABLE 11

| 11th example | | | |
|---|---|---|---|
| D1 (mm) | 5.10 | R (mm) | 0.04, 0.05 |
| D2 (mm) | 3.12 | L/R | 0.86, 1.00, 1.40, 1.25 |
| Lr1 (mm) | 0.29 | D1/D2 | 1.63 |
| Lr2 (mm) | 0.12 | Ref (%) | <2 |
| ET (mm) | 0.47 | NA | 2.34 |
| L (mm) | 0.043, 0.05, 0.07 | NB | 1.46 |

Image Lens System

An image lens system includes a barrel, a lens assembly and an annular optical spacer. The lens assembly is disposed in the barrel. The annular optical spacer is disposed in the barrel and is connected with the lens assembly. The aforementioned "the annular optical spacer is connected with the lens assembly" means that the annular optical spacer is connected with at least one optical element of the lens assembly. The annular optical spacer includes a first side portion, a second side portion, an outer annular portion, an inner annular portion and an anti-reflective layer. The second side portion is opposite to the first side portion. The outer annular portion connects the first side portion with the second side portion. The inner annular portion connects the first side portion with the second side portion. A vertical distance between the inner annular portion and a central axis of the annular optical spacer is shorter than a vertical distance between the outer annular portion and the central axis of the annular optical spacer. The inner annular portion includes at least one rugged surface. The rugged surface includes a plurality of annular protruding structures, and the annular protruding structures are coaxially arranged around the central axis and integrated with the rugged surface. The anti-reflective layer is on top of the rugged surface. Therefore, the unexpected lights can be eliminated effectively, and the image quality of the image lens system can be accordingly enhanced. The other details of the annular optical spacer have been described in the foregoing paragraphs and will not be repeated herein.

The lens assembly can include at least two optical elements, such as lens elements. Each of the first side portion and the second side portion of the annular optical spacer can include an abutting surface, and each of the abutting surfaces is perpendicular to the central axis of the annular optical spacer. The abutting surfaces of the annular optical spacer abut with the optical elements respectively. Therefore, the structural strength of the image lens system can be enhanced.

The lens assembly can include at least two lens elements. The abutting surface of the second side portion of the annular optical spacer abuts with the lens element which is closest to an image plane of the image lens system, and the abutting surface of the first side portion of the annular optical spacer abuts with the lens element which is secondary closest to the image plane of the image lens system. Therefore, the annular optical spacer can effectively minimize the unexpected lights traveling onto the image plane of the image lens system.

According to the above description of the present disclosure, the following 12th specific example is provided for further explanation.

12Th Example

Figure 15:
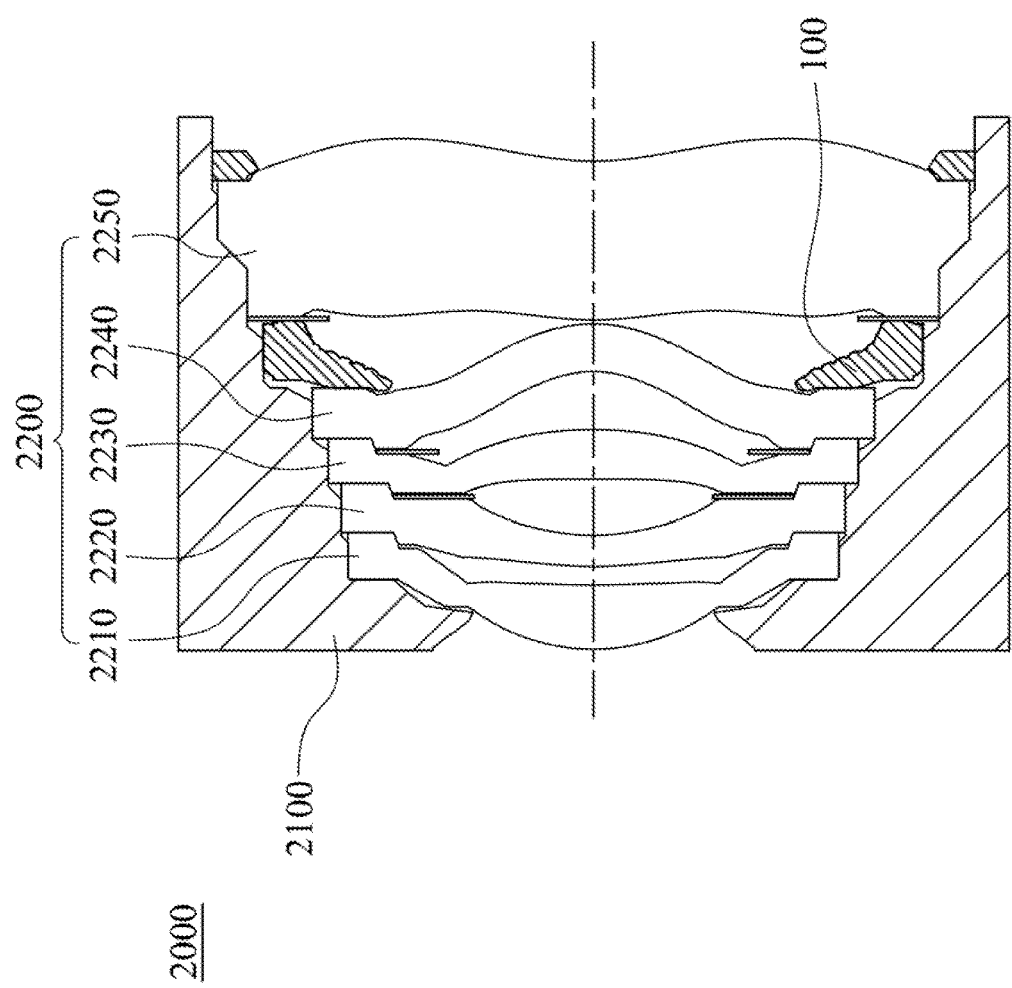
FIG. 15 is a cross-sectional schematic view of an image lens system according to the 12th example of the present disclosure.

FIG. 15 is a cross-sectional schematic view of an image lens system 2000 according to the 12th example of the present disclosure. The image lens system 2000 includes a barrel 2100, a lens assembly 2200 and the annular optical spacer 100. The lens assembly 2200 is disposed in the barrel 2100. The annular optical spacer 100 is disposed in the barrel 2100 and is connected with the lens assembly 2200. Specifically, the lens assembly 2200 includes a first lens element 2210, a second lens element 2220, a third lens element 2230, a fourth lens element 2240 and a fifth lens element 2250, wherein the fifth lens element 2250 is closest to an image plane of the image lens system 2000, and the fourth lens element 2240 is secondary closest to the image plane of the image lens system 2000. The annular optical spacer 100 is located between the fourth lens element 2240 and the fifth lens element 2250. The abutting surface 121 of the second side portion 120 abuts with a light limiting element (its reference numeral is omitted) next to the fifth lens element 2250, and the abutting surface 111 of the first side portion 110 abuts with the fourth lens element 2240.

Mobile Terminal

A mobile terminal is provided, wherein the mobile terminal includes an image lens system according to present disclosure. The image lens system includes an annular optical spacer according to present disclosure, so that the unexpected light can be eliminated effectively, and the image quality of the mobile terminal is enhanced. Preferably, the mobile terminal can further include but not limited to a display, a control unit, a random access memory unit (RAM), a read only memory unit (ROM) or a combination thereof.

According to the above description of the present disclosure, the following 13th-15th specific examples are provided for further explanation.

13Th Example

Figure 16:
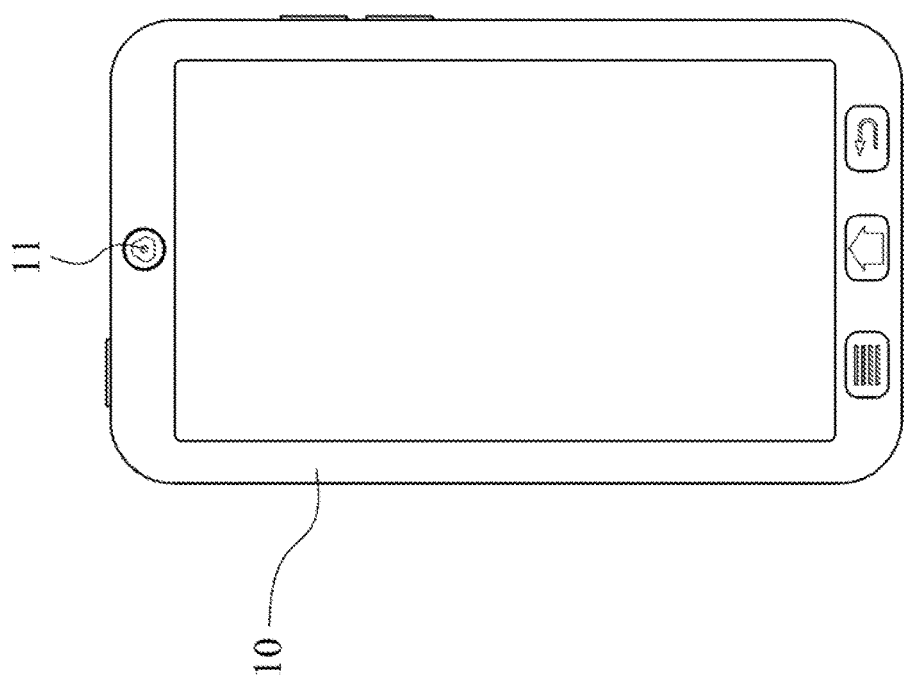
FIG. 16 is a schematic view of a mobile terminal according to the 13th example of the present disclosure.

FIG. 16 is a schematic view of a mobile terminal 10 according to the 13th example of the present disclosure. The mobile terminal 10 of the 13th example is a smart phone, wherein the mobile terminal 10 includes an image capturing device 11. The image capturing device 11 includes an image lens system (its reference numeral is omitted) according to the present disclosure and an image sensor (its reference numeral is omitted), wherein the image sensor is disposed on or near an image plane of the image lens system.

14Th Example

Figure 17:
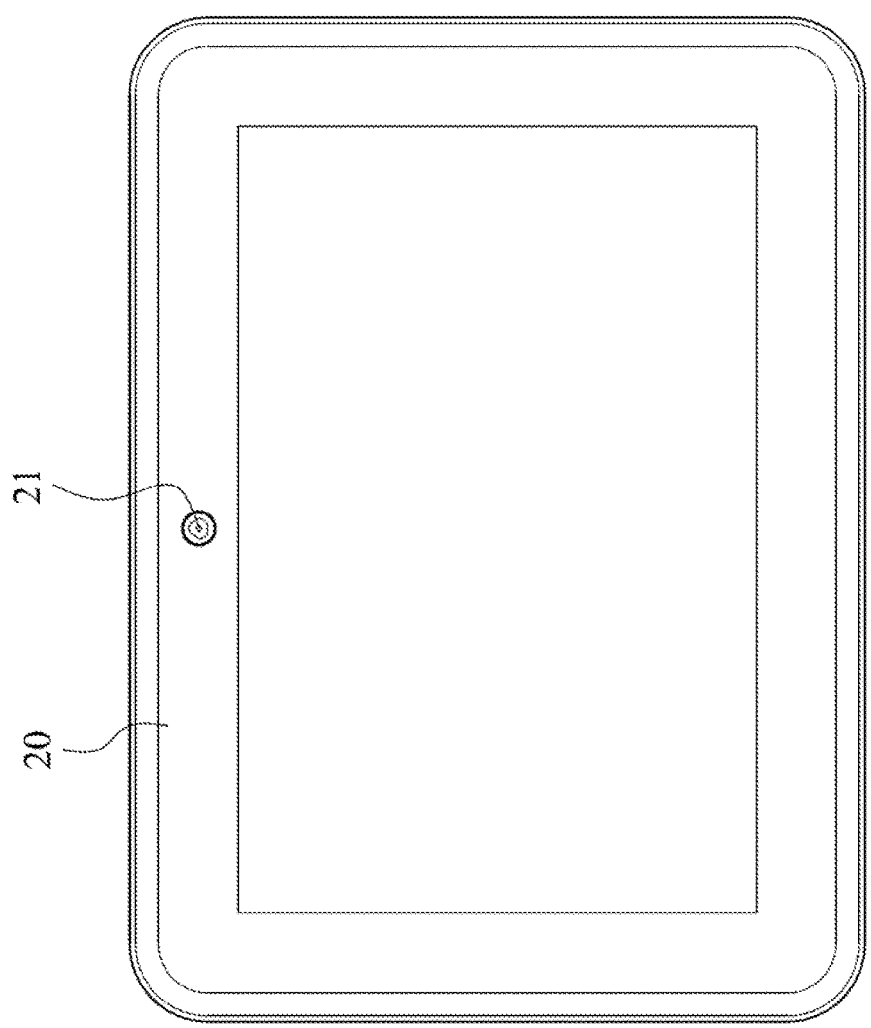
FIG. 17 is a schematic view of a mobile terminal according to the 14th example of the present disclosure.

FIG. 17 is a schematic view of a mobile terminal 20 according to the 14th example of the present disclosure. The mobile terminal 20 of the 14th example is a tablet personal computer, wherein the mobile terminal 20 includes an image capturing device 21. The image capturing device 21 includes an image lens system (its reference numeral is omitted) according to the present disclosure and an image sensor (its reference numeral is omitted), wherein the image sensor disposed on or near an image plane of the image lens system.

15Th Example

Figure 18:
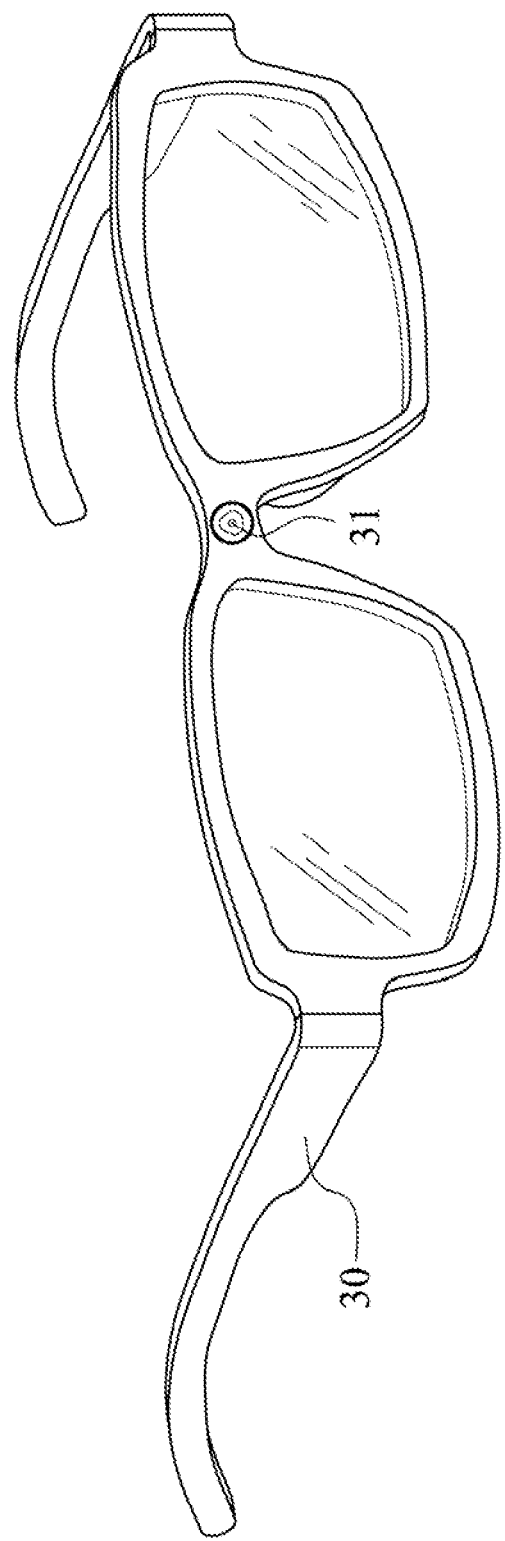
FIG. 18 is a schematic view of a mobile terminal according to the 15th example of the present disclosure.

FIG. 18 is a schematic view of a mobile terminal 30 according to the 15th example of the present disclosure. The mobile terminal 30 of the 15th example is a head-mounted display, wherein the mobile terminal 30 includes an image capturing device 31. The image capturing device 31 includes an image lens system (its reference numeral is omitted) according to the present disclosure and an image sensor (its reference numeral is omitted), wherein the image sensor is disposed on or near an image plane of the image lens system.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An annular optical spacer configured to be disposed between two lens elements for providing an optical space between the two lens elements, the annular optical spacer comprising:
    a first side portion;
    a second side portion opposite to the first side portion;
    a central through hole coaxial with a central axis of the annular optical spacer;
    an outer annular portion disposed around the central through hole and connecting the first side portion with the second side portion;
    an inner annular portion disposed around the central through hole and connecting the first side portion with the second side portion, wherein a vertical distance between the inner annular portion and the central axis of the annular optical spacer is shorter than a vertical distance between the outer annular portion and the central axis of the annular optical spacer, and the inner annular portion comprises:
  at least one rugged surface comprising a plurality of annular protruding structures, wherein the annular protruding structures are coaxially arranged around the central axis; and
  an anti-reflective layer on top of the rugged surface;
wherein the annular optical spacer is made of opaque plastic material;
wherein a diameter of the central through hole decreased along the rugged surface from the second side portion to the first side portion;
wherein each of the annular protruding structures is arc-shaped, a maximum width of each of the annular protruding structures is L, a curvature radius of each of the annular protruding structures is R, and the following relationship is satisfied:

$0.65 < L/R < 1.65.$

2. The annular optical spacer of claim 1, wherein the annular protruding structures are integrated with the rugged surface.

3. The annular optical spacer of claim 2, wherein each of the first side portion and the second side portion comprises an abutting surface, and each of the abutting surfaces is perpendicular to the central axis of the annular optical spacer.

4. The annular optical spacer of claim 2, wherein the curvature radius of each of the annular protruding structures is R, and the following relationship is satisfied:

$0.02 \text{ mm} < R < 0.10 \text{ mm}.$

5. The annular optical spacer of claim 4, wherein the curvature radius of each of the annular protruding structures is R, and the following relationship is satisfied:

$0.035 \text{ mm} < R < 0.07 \text{ mm}.$

6. The annular optical spacer of claim 2, wherein the anti-reflective layer comprises a plurality of films, the films are stacked orderly, a number of the films is N, and the following relationship is satisfied:

$2 < N < 12.$

7. The annular optical spacer of claim 6, wherein a reflectivity of the anti-reflective layer for light wavelengths between 400 nm and 700 nm is Ref, and the following relationship is satisfied:

$Ref < 2\%.$

8. The annular optical spacer of claim 7, wherein the anti-reflective layer comprises:
  a plurality of high refractive index films; and
  a plurality of low refractive index films;
  wherein the high refractive index films and the low refractive index films are alternately stacked, a refractive index of each of the high refractive index films is NA, a refractive index of each of the low refractive index films is NB, and the following relationships are satisfied:

$1.8 \leq NA;$ and $NB \leq 1.5.$

9. The annular optical spacer of claim 2, wherein the annular optical spacer is manufactured by an injection molding method.

10. The annular optical spacer of claim 9, wherein each of the first side portion and the second side portion comprises an abutting surface, each of the abutting surfaces is perpendicular to the central axis of the annular optical spacer, and a radial length of the abutting surface of the first side portion is longer than a radial length of the abutting surface of the second side portion; and
  wherein in a molding stage of the injection molding method, the first side portion is adjacent to a moving part of a mold, and the second side portion is adjacent to a fixed part of the mold.

11. The annular optical spacer of claim 4, wherein a maximum outer diameter of the annular optical spacer is D1, a minimum inner diameter of the annular optical spacer is D2, and the following relationship is satisfied:

$0.4 \leq D1/D2 \leq 0.8.$

12. The annular optical spacer of claim 1, wherein a number of the annular protruding structures is M, and the following relationship is satisfied:

$4 \leq M.$

13. The annular optical spacer of claim 12, wherein the number of the annular protruding structures is M, and the following relationship is satisfied:

$7 \leq M \leq 20.$

14. The annular optical spacer of claim 2, wherein the rugged surface is an atomized surface.

15. An image lens system, comprising:
  a barrel,
  a lens assembly disposed in the barrel; and
  an annular optical spacer disposed in the barrel and connected with the lens assembly, wherein the annular optical spacer is configured to be disposed between two lens elements for providing an optical space between the two lens elements, and the annular optical spacer comprises:
    a first side portion;
    a second side portion opposite to the first side portion;
    a central through hole coaxial with a central axis of the annular optical spacer;
    an outer annular portion disposed around the central through hole and connecting the first side portion with the second side portion;
    an inner annular portion disposed around the central through hole and connecting the first side portion with the second side portion, wherein a vertical distance between the inner annular portion and the central axis of the annular optical spacer is shorter than a vertical distance between the outer annular portion and the central axis of the annular optical spacer, and the inner annular portion comprises:
      at least one rugged surface comprising a plurality of annular protruding structures, wherein the annular protruding structures are coaxially arranged around the central axis and integrated with the rugged surface; and
      an anti-reflective layer on top of the rugged surface;
    wherein the annular optical spacer is made of opaque plastic material;
    wherein a diameter of the central through hole decreased along the rugged surface from the second side portion to the first side portion;

wherein each of the annular protruding structures is arc-shaped, a maximum width of each of the annular protruding structures is L, a curvature radius of each of the annular protruding structures is R, and the following relationship is satisfied:

$0.65 < L/R < 1.65$.

16. The image lens system of claim 15, wherein the lens assembly comprises at least two optical elements, each of the first side portion and the second side portion comprises an abutting surface, each of the abutting surfaces is perpendicular to the central axis of the annular optical spacer, and the abutting surfaces abut with the optical elements respectively.

17. The image lens system of claim 16, wherein the lens assembly comprises at least two lens elements, the abutting surface of the second side portion abuts with the lens element which is closest to an image plane, and the abutting surface of the first side portion abuts with the lens element which is secondary closest to the image plane.

18. The image lens system of claim 16, wherein a distance between the abutting surface of the first side portion and the abutting surface of the second side portion in parallel with the central axis is ET, and the following relationship is satisfied:

$0.15 \text{ mm} < ET < 0.75 \text{ mm}$.

19. A mobile terminal, comprising:
the image lens system of claim 15.

20. An annular optical spacer having a central axis and configured to be disposed between two lens elements which have a common optical axis, wherein the central axis of the annular optical spacer is coincident with the optical axis of the two lens elements, and the annular optical spacer comprises:
an inner annular portion, wherein the inner annular portion is ring-shaped and formed completely about the central axis of the annular optical spacer, and the inner annular portion has an inner surface defining a central through hole of the annular optical spacer, and an outer surface opposite to the inner surface;
an outer annular portion, wherein the outer annular portion is ring-shaped and formed completely about the central axis, and has an inside surface connected to the outer surface of the inner annular portion, an outside surface opposite to the inside surface thereof;
wherein the inner annular portion comprises a first face that extends from the inner surface to the outer surface thereof on one side of the inner annular portion in a direction away from the central axis of the annular optical spacer, and a second face that extends from the inner surface to the outer surface thereof on an opposite side of the inner annular portion;
wherein the first face of the inner annular portion comprises a plurality of annular protruding structures, wherein each of the annular protruding structures is arc-shaped and the annular protruding structures are connected end-to-end along the first face of the inner annular portion;
wherein the annular protruding structure closest to the inner surface of the inner annular portion is spaced apart in an axial direction of the annular optical spacer from the annular protruding structure closest to the outer surface of the inner annular portion;
wherein an anti-reflective layer is disposed on top of the annular protruding structures;
wherein a maximum width of each of the annular protruding structures is L, a curvature radius of each of the annular protruding structures is R, and the following relationship is satisfied:

$0.65 < L/R < 1.65$.

21. The annular optical spacer of claim 20, wherein the inner annular portion has a radial direction perpendicular to the axial direction of the annular optical spacer, and a line drawn between the inner surface and the outer surface of the inner annular portion forms an angle with the radial direction of the inner annular portion.

* * * * *

UNITED STATES PATENT AND TRADEMARK OFFICE
CERTIFICATE OF CORRECTION

PATENT NO. : 9,946,047 B2  
APPLICATION NO. : 14/256992  
DATED : April 17, 2018  
INVENTOR(S) : Cheng-Feng Lin and Ming-Ta Chou Page 1 of 1

It is certified that error appears in the above-identified patent and that said Letters Patent is hereby corrected as shown below:

On the Title Page

In Item (54) and in the Specification, in Column 1, Lines 1-2, the title reads as "ANNUAL OPTICAL SPACER, IMAGE LENS SYSTEM, AND MOBILE TERMINAL", but it should read as "ANNULAR OPTICAL SPACER, IMAGE LENS SYSTEM, AND MOBILE TERMINAL".

Signed and Sealed this
Eleventh Day of September, 2018

Andrei Iancu
*Director of the United States Patent and Trademark Office*